US009037485B2

(12) United States Patent
Fu et al.

(10) Patent No.: US 9,037,485 B2
(45) Date of Patent: May 19, 2015

(54) PERSISTENTLY DETERMINING AND SHARING USER STAYS OF A USER OF A MOBILE DEVICE

(71) Applicants: Yun Fu, Cupertino, CA (US); Chenyu Wang, Mountain View, CA (US); Sam Song Liang, Palo Alta, CA (US); Jason Chalecki, East Palo Alto, CA (US); David Smiddy, San Francisco, CA (US); Marlene Wan, Cupertino, CA (US)

(72) Inventors: Yun Fu, Cupertino, CA (US); Chenyu Wang, Mountain View, CA (US); Sam Song Liang, Palo Alta, CA (US); Jason Chalecki, East Palo Alto, CA (US); David Smiddy, San Francisco, CA (US); Marlene Wan, Cupertino, CA (US)

(73) Assignee: Alohar Mobile Inc., Palo Alto, CA (US)

( * ) Notice: Subject to any disclaimer, the term of this patent is extended or adjusted under 35 U.S.C. 154(b) by 0 days.

(21) Appl. No.: 14/314,286

(22) Filed: Jun. 25, 2014

(65) Prior Publication Data

US 2014/0310366 A1    Oct. 16, 2014

Related U.S. Application Data

(63) Continuation-in-part of application No. 13/896,726, filed on May 17, 2013, which is a continuation-in-part of application No. 13/278,396, filed on Oct. 21, 2011, now Pat. No. 8,725,569.

(Continued)

(51) Int. Cl.
*G06Q 30/00* (2012.01)
*H04L 12/58* (2006.01)
(Continued)

(52) U.S. Cl.
CPC ............ *H04L 51/04* (2013.01); *G06Q 30/0261* (2013.01); *G06Q 30/0255* (2013.01);
(Continued)

(58) Field of Classification Search
CPC .................................................. G06Q 30/0269
USPC ....................................................... 705/14.66
See application file for complete search history.

(56) References Cited

U.S. PATENT DOCUMENTS 6,917,940 B1    7/2005    Chen et al.
6,975,873 B1    12/2005   Banks et al.

(Continued)

FOREIGN PATENT DOCUMENTS

KR    10-2008-0119603    6/2010

OTHER PUBLICATIONS

Using GPS to Learn Significant Locations and Predict Movement Across Multiple Users; Daniel Ashbrook and Thad Starner, College Of Computing, Georgia Institute of Technology.

(Continued)

*Primary Examiner* — John G Weiss
*Assistant Examiner* — Scott C Anderson
(74) *Attorney, Agent, or Firm* — Brian R. Short

(57) ABSTRACT

Methods, systems and apparatuses for automatically detecting and sharing user stays of a mobile device of a user are disclosed. One method includes persistently collecting location information, determining a group of users for sharing the user stays, determining whether the mobile device is within a specific distance of a specific location for at least specific minimum duration based on the location information, determining a user stay based on the location information and the specific distance, determining if the user stay is private or public to at least a portion of the group of users based on preferences of the user and the location information, and sharing the user stay with the at least the portion of the group of users by sending notifications to the group of users if the user stay is determined to be public to the at least the portion of the group of users.

29 Claims, 14 Drawing Sheets

Related U.S. Application Data

(60) Provisional application No. 61/859,229, filed on Jul. 27, 2013, provisional application No. 61/649,260, filed on May 19, 2012, provisional application No. 61/406,198, filed on Oct. 25, 2010.

(51) Int. Cl.

| | |
|---|---|
| *H04W 4/02* | (2009.01) |
| *H04W 52/02* | (2009.01) |
| *H04W 4/20* | (2009.01) |
| *H04W 12/00* | (2009.01) |
| *H04W 68/00* | (2009.01) |
| *G06Q 30/02* | (2012.01) |
| *H04L 29/08* | (2006.01) |
| *H04M 1/725* | (2006.01) |

(52) U.S. Cl.
CPC ............ *G06Q30/0269* (2013.01); *H04W 4/02* (2013.01); *H04W 4/023* (2013.01); *H04W 52/0251* (2013.01); *H04L 67/306* (2013.01); *H04M 1/72572* (2013.01); *H04W 4/028* (2013.01); *H04W 4/206* (2013.01); *H04W 12/00* (2013.01); *H04W 68/00* (2013.01)

(56) References Cited

U.S. PATENT DOCUMENTS

| | | | |
|---|---|---|---|
| 7,483,946 B2 | 1/2009 | Boyd | |
| 2002/0111172 A1 | 8/2002 | Dewolf et al. | |
| 2003/0040946 A1 | 2/2003 | Spenger et al. | |
| 2003/0176931 A1 | 9/2003 | Pednault et al. | |
| 2007/0219706 A1 | 9/2007 | Sheynblat | |
| 2007/0281689 A1* | 12/2007 | Altman et al. | 455/435.1 |
| 2008/0214210 A1 | 9/2008 | Rasanen et al. | |
| 2008/0215557 A1 | 9/2008 | Ramer et al. | |
| 2009/0048977 A1* | 2/2009 | Aggarwal et al. | 705/50 |
| 2009/0177384 A1 | 7/2009 | Walder | |
| 2009/0248457 A1* | 10/2009 | Munter et al. | 705/5 |
| 2010/0041378 A1 | 2/2010 | Aceves et al. | |
| 2010/0073201 A1 | 3/2010 | Holcomb et al. | |
| 2010/0125406 A1 | 5/2010 | Prehofer | |
| 2010/0211649 A1* | 8/2010 | Dimas et al. | 709/206 |
| 2010/0229190 A1 | 9/2010 | Koo et al. | |
| 2010/0250136 A1 | 9/2010 | Chen | |
| 2011/0143777 A1 | 6/2011 | Kim et al. | |
| 2011/0161427 A1 | 6/2011 | Fortin et al. | |
| 2011/0181517 A1 | 7/2011 | Orr et al. | |
| 2011/0184640 A1 | 7/2011 | Coleman et al. | |
| 2011/0238289 A1 | 9/2011 | Lehmann et al. | |
| 2011/0239158 A1 | 9/2011 | Barraclough et al. | |
| 2011/0313649 A1 | 12/2011 | Bales et al. | |

OTHER PUBLICATIONS

Mining Personally Important Places from GPS Tracks; Changqing Zhou, Nupur Bhatnagar, Shashi Shekhar, Loren Terveen, Department of Computer Science and Engineering, University of Minnesota.

Extracting Places and Activities from GPS Traces Using Hierarchical Conditional Random Fields, Lin Liao Dieter Fox Henry Kautz, Department of Computer Science & Engineering University of Washington.

Mining Significant Semantic Locations From GPS Data, Xin Cao\ Gao Cong\ Christian S. Jensen, School of Computer Engineering, Nanyang Technological University, Singapore.

Mining GPS Data for Extracting Significant Places, G. Agamennoni, J. Nieto, E. Nebot, Australian Center for Field Robotics, University of Sydney, Australia.

Learning Significant User Locations with GPS and GSM, Department of Electrical Engineering and Computer Science, Massachusetts Institute of Technology, Sep. 2006.

* cited by examiner

701
Friend 6 is OTG
Since 9:10am Feb 10, 2014

702
Friend 3, Friend 4 and Friend 5
Arrive at POI 3
9:00am Feb 10, 2014

703
Friend 1
Departed from POI
8:30am Feb 10, 2014

704
Friend 2
Arrive at POI 2
8:10am Feb 10, 2014

705
Friend 1
Arrive at POI 1
8:00am Feb 10, 2014

FIGURE 7

PERSISTENTLY DETERMINING AND SHARING USER STAYS OF A USER OF A MOBILE DEVICE

RELATED APPLICATIONS

This patent application claims priority to U.S. Provisional Patent Application No. 61/859,229, filed Jul. 27, 2013, and is a continuation-in-part of U.S. patent application Ser. No. 13/896,726, titled " Determining User Stays of a User of a Mobile Device", filed May 17, 2013, which claims priority to U.S. Provisional Patent Application No. 61/649,260, filed May 19, 2012, and is a continuation-in-part of U.S. patent application Ser. No. 13/278,396, titled "Location Based User Behavior Analysis and Applications", filed Oct. 21, 2011, which claims priority to U.S. Provisional Patent Application No. 61/406,198, filed Oct. 25, 2010, which are herein all incorporated by reference.

FIELD OF THE DESCRIBED EMBODIMENTS

The described embodiments relate generally to location-based services. More particularly, the described embodiments relate to methods, systems and apparatuses for persistently determining and sharing user stays of a user of a mobile device.

BACKGROUND

There is an increasing need to automatically monitor a mobile device user's location and other behavior, understand the user's habits and interests, and provide intelligent personal assistance to the user based on the user's habits and interests obtained through location based behavior analysis. Presently, location based services include manual check-ins. For a manual check-in, the user opens an application on their mobile device manually, and indicates that they are at a specific business.

In the area of location-based services, a check-in represents a single visit by a user to a location or place on the earth. One of the main problems with checking in is check-in fatigue. The fact that most popular social networks require users to manually enter their location makes them pretty tedious considering there is often little to no reward. FourSquare®, Facebook® or Google Latitude® have developed check-in technology based on geo-fencing and background location monitoring that can trigger some interesting applications by getting close. However, this type of solution is not generative, which require users to input his favorite places into the system in advance. It cannot be applied to a new place that is not in the scope of existing places database of the user.

Additionally, location-based searches are manual. That is, the user conducts a search of some business using keyword, such as "restaurant", and the application returns results that are the closest to the user's current location.

Other location-based service includes mobile social applications wherein, for example, friends are shown on a map. However, that services and applications are limited because they can't accurately determine the point of the interest the user is at, hard to disambiguate between multiple points of interest near each other. Generally, current local business or POI search is only using the spatial data as input, which does not generally provide enough information to accurately determine the point of interest.

There is an increasing need to automatically monitor a user's location and notify relevant people of the user's location. For example, family members may want to monitor each other's location and automatically receive notifications when they arrive at or depart from a place (location) for peace of mind. Parents may want to get notifications when their kids arrive at dangerous, inappropriate, or unusual place. Students in a class may want to share the location where they are automatically so that they can locate each other in an easy way for studying or playing together. Employees in a company may want to see colleagues' locations to schedule communication more efficiently.

It is desirable to have a method, apparatus and system for persistently determining and sharing user stays of a user of a mobile device.

SUMMARY

An embodiment includes a method of automatically detecting and sharing user stays of a mobile device of a user. The method includes persistently collecting, by the mobile device, location information, determining a group of users for sending notifications and sharing the user stays, determining whether the mobile device is within a specific distance of a specific location for at least specific minimum duration based on the location information, determining a user stay based on the location information and the specific distance, determining if the user stay is private or public to at least a portion of the group of users based on preferences of the user and the location information, and sharing the user stay with the at least the portion of the group of users by sending notifications to the group of users if the user stay is determined to be public to the at least the portion of the group of users.

Another embodiment includes a mobile device. The mobile device includes a location sensor operative to sense location information of the mobile device, a transceiver operative to establish a communication link with a network server, and a controller. At least one of the controller or the network server are operative to automatically detect user stays of a mobile device of a user, determine a group of users for sending notifications and sharing the user stays, determine whether the mobile device is within a specific distance of a specific location for at least specific minimum duration based on the location information, determine a user stay based on the location information and the specific distance, determine if the user stay is private or public to at least a portion of the group of users based on preferences of the user and the location information, and share the user stay with the at least the portion of the group of users by sending notifications to the group of users if the user stay is determined to be public to the at least the portion of the group of users.

Another embodiment includes a network server operative to receive sensed location information of a mobile device, wherein the location information was sensed by the mobile device. At least one of the network server or a controller of the mobile device are operative to automatically detect user stays of a mobile device of a user, determine a group of users for sending notifications and sharing the user stays, determine whether the mobile device is within a specific distance of a specific location for at least specific minimum duration based on the location information, determine a user stay based on the location information and the specific distance, determine if the user stay is private or public to at least a portion of the group of users based on preferences of the user and the location information, and share the user stay with the at least the portion of the group of users by sending notifications to the group of users if the user stay is determined to be public to the at least the portion of the group of users.

Other aspects and advantages of the described embodiments will become apparent from the following detailed description, taken in conjunction with the accompanying drawings, illustrating by way of example the principles of the described embodiments.

BRIEF DESCRIPTION OF THE DRAWINGS

FIG. 7 shows a display of a user that includes a timeline of user stays of other users in a same group as the user, according to an embodiment.

DETAILED DESCRIPTION

Figure 1:
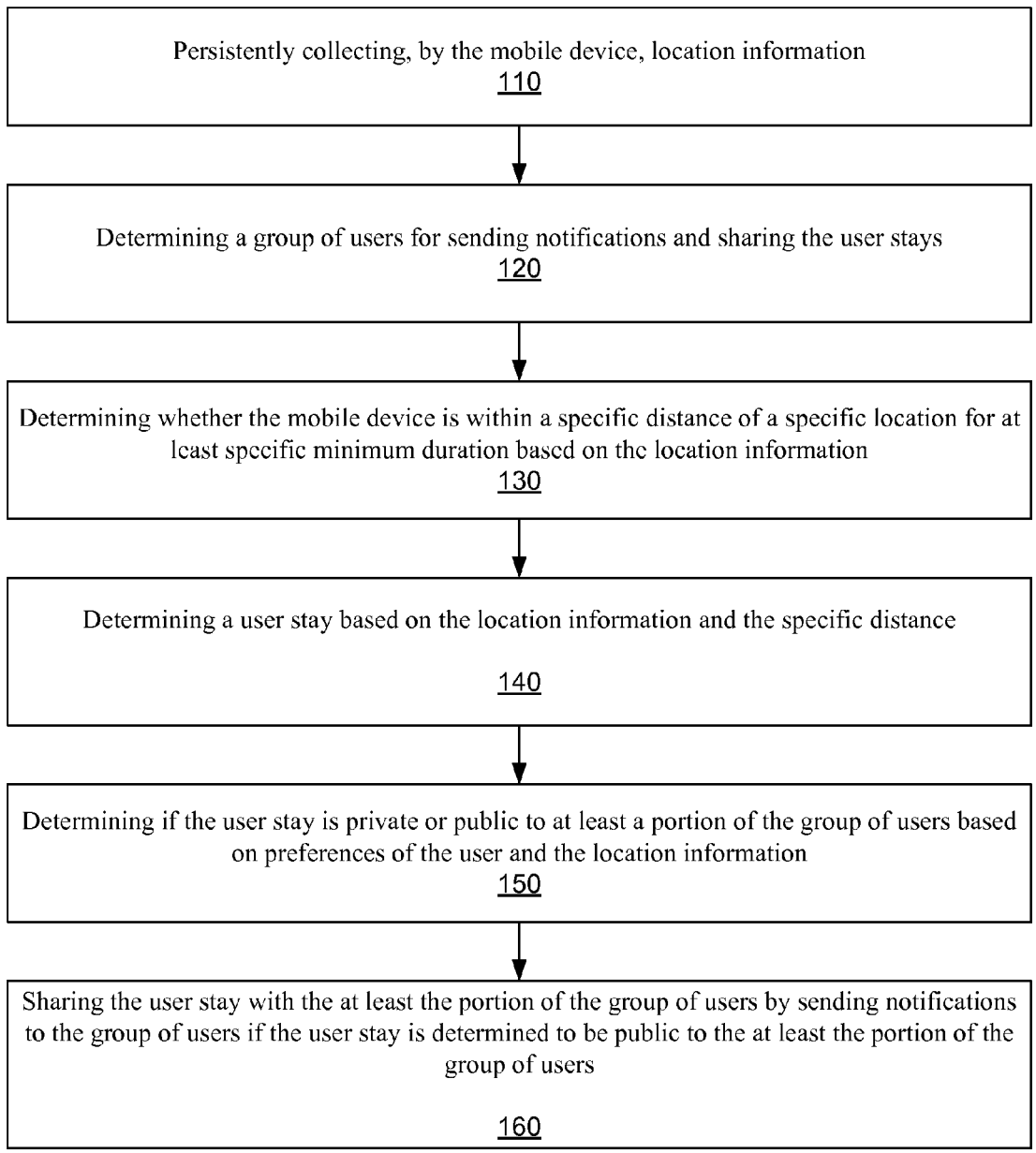
FIG. 1 is a flow chart that includes steps of a method of automatically detecting and sharing user stays of a mobile device of a user, according to an embodiment.

The described embodiments include methods, systems and apparatuses for persistently determining and sharing (for example, sending notifications) user stays of a user of a mobile device. For an embodiment, the notification includes a brief description about the time, the place name, and/or the address of the user stay. For an embodiment, the notification also includes whether the notification is regarding an arrival or a departure of the user stay. Once the recipient receives the notification, the recipient can open a mobile application to view details of the user stay. For at least some embodiments, the recipient can see an entire history of user stays shared by connected members of a group of users.

Some existing systems require and leverage a user input. At least some of these systems give a user an incentive to register a place name on their mobile software every time the user enters a place of interest or significance. That is, the existing systems are relatively primitive and require a user input specifying the time when the user stayed at a place or what that place is, or both. In contrast, at least some of the described embodiments do not require a user input and automatically detect the fact that the user stayed proximate to a location (for at least some embodiments, the coupling proximity, time and place is referred to as a "user stay"). That is, at least some embodiments include determining a user stay without real-time input by the user of the mobile device. That is, any user inputs are displaced from the time and place at which the user stay is being determined, or the time and place at which the user inputs are received do not influence the user stay determination.

At least some of the described embodiments provide systems, apparatuses and methods for persistently tracking locations of mobile device users, automatically detecting user stays, and sending real-time notifications to share the user stay information within a group of users. A user stay is an event that a user stays at a place for a period of time. User stay detection comprises determining the start time, when the user arrives at a place, and the end time, when the user departs the place, and matching POI for the place.

For at least some embodiments, a user stay of a user of the mobile device is defined by the mobile device being within the specific distance (which for at least some embodiments, is determined by a threshold physical distance) of a location for at least the specific minimal duration (which can also be defined by a threshold period of time). As described, the location of the mobile device changes over time, and the specific location changes over time as the locations of the mobile changes. The location of the mobile device is tracked over time. A distance of the mobile device can be defined by the distance of each location point (such as, GPS data point) associated with the mobile device to a location, such as, the specific location. The minimal time duration can be defined by the amount of time the mobile device is within the specific distance (or threshold distance) from the specific location.

As previously stated, for at least some embodiments, the specific location adaptively changes over time as the mobile device moves. At least some embodiments include determining the specific location by statistically calculating the specific location based on a plurality of locations of the mobile device over a period of time. For an embodiment, the period of time is determined based on the start time and the end time. As will be described, the statistical calculation can include the determination of a centroid.

An embodiment includes associating a Point of Interest (POI) with the specific location. For at least some embodiments, the POI is defined as a specific point location or place that someone may find useful or interesting. There can be at least two types of POIs: public POIs (e.g. stores, parks) that one can obtain from POI database services, and personal POIs (e.g. home, friend's home) that are personal to a mobile user. As described, the specific distance and the specific minimum time duration can adaptively change based on an identified POI associated with the user stay. For example, the specific distance and the specific minimum time duration associated with a physically large POI (such as, a convention hall or sports stadium) can be quite different than the specific distance and the specific minimum time duration associated with physically small POI (such as, a small shop or residence).

A POI can have several properties, such as latitude and longitude, a name (e.g., Olive Garden), a category (for instance, restaurant), and a subcategory (for example, Italian cuisine). A POI can be of different sizes, and can have a hierarchical structure. For example, a POI can be a big park, such as Yosemite. Inside the park, there can be smaller POIs, such as a hotel or a restaurant. Furthermore, a POI can be associated with an event name (for example, a concert of Beatles, or a baseball game in a stadium, a seminar on cooking).

For at least some of the embodiments described, a user stay is defined as an event in which a specific user visits a specific POI at a specific time. For embodiments, each user stay has attributes including reference to the POI, start time of the visit, duration of the visit, and the device (as a proxy of the user) that detects the visit. A user stay can be detected by clustering user location data continuously collected by the mobile device of a user, computing the cluster's centroid, and then matching it to a nearby POI. In addition to its geographical presence, a user stay can include temporal presence, such as events scheduled at the specific POI. For example, the POI like a stadium can have football game on Friday, a concert on Saturday, and a baseball game on Sunday. For at least some embodiments, such an event is defined as an event of interest (EOI), which can be an attribute of a user stay.

For at least some embodiments, the determinations of user stays and the user's points of interest are automatic. That is, user stay and/or POI determination processing is automatically executed without the user proactively or reactively providing input. For some embodiments, the determination of the user's user stays and/or POIs does not require manual input from the user. The processing can be performed in the background, and operate on persistently collected sensor data (optionally uploading the data to a server). For an embodiment, a background-processing algorithm determines the user stay and/or POI. Note, all or portions of the user stay and/or POI determination algorithms can run on both mobile client side (the mobile device) and server side (a server connected to the mobile device through a network). Other embodiments include semi-automatic processing in which a user's input or feedback can optionally be included with the processing to improve the process. For example, user inputs, such as correcting or adding or deleting a user stay and/or POI, can be used as important feedback information to boost the performance of overall user stay and/or POI determination processing.

For some embodiments, the processing is performed (at the mobile device and/or at the server) in real-time, and for some embodiments the processing includes post-processing. For real-time processing, the user stay and/or POI determination is made with a short delay (e.g. 10 seconds or a minute) after the user arrives at the user stay and/or POI, with a determination deadline being adaptively specified depending on the application. For post-processing, the user stay and/or POI determination is made beyond the short delay (or without a deadline).

For at least some embodiments, a current state of a user is defined as the user's current location, time and what the user is doing.

Embodiments include tracking user stays of the user over time, wherein the user stays include at least one location and creating a user profile for the user based at least in part on at least one of an arrival time, a duration or a frequency of visits of the user at each of the user stays. For at least some embodiments, the user profile is defined as the results of location based user behavior analysis. For at least some embodiments, the user profile includes the fundamental statistics, such as the number of visits, the time of visit, and the average and total duration of all visits to one POI. Furthermore, for at least some embodiments the user profile includes location behavior patterns learned from the fundamental statistics. For example, it includes user's location preference, such as which POIs or EOIs a user visits often, at what time of the day and/or day of week, user's location transitions between different POIs, and user preferred routes between POIs according to trail information. For example, the statistical transitions can include one-step location behavior change, such as the user visiting place A after place B, or multi-step location behavior change, visiting place A after place B and then going to place C. In addition, for at least some embodiments, the user profile includes user manually input preferences. The user profile includes characteristics of the user. One characteristic of the user includes a history of locations of interest of the user. For at least some embodiments, the user profile includes the statistics of the categories and subcategories of the POIs and EOIs the user has visited.

FIG. 1 is a flow chart that includes steps of a method of automatically detecting and sharing user stays of a mobile device of a user. A first step 110 includes persistently collecting, by the mobile device, location information. A second step 120 includes determining a group of users for sending notifications and sharing the user stays. A third step 130 includes determining whether the mobile device is within a specific distance of a specific location for at least specific minimum duration based on the location information. A fourth step 140 includes determining a user stay based on the location information and the specific distance. A fifth step 150 includes determining if the user stay is private or public to at least a portion of the group of users based on preferences of the user and the location information. A sixth step 160 includes sharing the user stay with the at least the portion of the group of users by sending notifications to the group of users if the user stay is determined to be public to the at least the portion of the group of users.

As described, for at least some embodiments, the user stay includes at least one of an arrival time, and a departure time, of which, for at least some embodiments, are determined based on the location information and the specific distance.

At least some embodiments further include sharing other location information to the at least the portion of the group of users if the user stay is determined to be public to the at least the portion of the group of users.

At least some embodiments further include identifying a point of interest (POI) for the user stay based on the location information and user stay history of the user and user stay history of the group of users, wherein the user stay history of the user includes past user stays of the user, and wherein the user stay history of the group of users includes past user stays of the group of users.

For at least some embodiments, the group of users for sharing the user stay includes pair-wise connections, wherein a pair of connected of users share user stay information with each other. For at least some embodiments, the group of users for sharing the user stay includes a unidirectional following relationship, wherein the user shares user stays with users of the group of users who want to follow the user. For at least some embodiments, the group of users for sharing the user stay includes a membership, wherein users in the group share user stay information with all members of the group of users.

As described, for an embodiment, a user shares user stays with a group of users. For an embodiment, the users in the group are referred to as "connected users" or "connections" for simplicity. As described, for an embodiment, the group is determined by pair-wise connections, where a pair of connected users share user stays with each other. For example, two family members may establish a connection with each other. Then, they (the family members) can see each other's user stay information. Also as described, for an embodiment the group is determined by unidirectional following relationship, wherein a user shares user stays with users who want to follow the user. For example, a celebrity may want to share her user stays with anyone who want to follow her. If a user follows the celebrity, the user is notified when the celebrity arrives at or departs from places. Also, as described, for an embodiment, the group is also determined by membership instead one-to-one relationship, wherein users in a group share user stay information with all the members in the group. For example, all students in a class can share user stays with each other.

For at least some embodiments, determining if a user stay is private or public to the group members, is specified by the user using a list of points of interest (POIs), POI categories, geographical regions, and time of day and/or day of week. For at least some embodiments, the user can specify a list of users who do not receive notifications or see user stays of the user.

At least some embodiments, allows users to set a user stays as private, which is visible only to users who generate them. A user can manually set a detected user stay to private. However, to automatically set user stays detected in the future to be private, a user can specify a black list of POIs not to share. For example, the user can specify not to share stays at home with friends. A user can also specify a black list of POI categories not to share. For example, the user can specify not to share user stays with POI categories as hotel. A user can also specify a black list of geographical regions not to share. For example, the user can specify that user stays in the county of his office are not shareable. Alternatively, a user can specify a time period not to share. The time period can be specified by time of day and/or day of week. For example, the user can specify that user stays in Saturday and Sunday should not be shared. In the above examples, the user specifies private user stays using a black list of POIs, POI categories, geographical regions, and time of day and/or day of week. It is also possible for the user to specify a white list of POIs, POI categories, geographical regions, and time of day and/or day of week. Then, only user stays matching the white list of criteria are visible to connected users. All other user stays are private.

At least some embodiments further include determining an arrival of the user stay and a departure of the user stay, and wherein sharing the user stay comprises sending a push notification, SMS (small messaging system), or emails to group members about the arrival and the departure of the user stay and other related information, wherein the arrival includes an arrival time of the user stay and the POI, and the departure includes a departure time of the user stay and the POI. At least some embodiments further include determining if the push notification should be sent is specified by the user of the user stay and recipients of the notification using a black list or a white list of POIs, POI categories, geographical regions, time of day and/or day of week. For at least some embodiments, user stay privacy is controlled at user level. Although a user establishes a connection with another user, the user may want to hide user stays to the connected user. The user can specify a list of users who cannot see the user's user stays. To further control the visibility of user stays, the user can specify that a connected user cannot see his user stays for a black list of POIs, POI categories, geographical regions, and time of day and/or day of week. Alternatively, the user can specify that a connected user can only see his user stays for a white list of POIs, POI categories, geographical regions, and time of day and/or day of week.

For at least some embodiments, a system identified POI for a user stay may not be the POI a user actually visited. Further, a user may want to customize the POI name for a user stay. For example, a user Eric may wants to name a user stay at his home as Eric's Home. So for at least some embodiments, a user can correct the system selected POIs for user stays. Meanwhile, a user can correct the system selected POIs for user stays of connected group users.

For at least some embodiments, identifying a POI for a user stay includes matching a POI with the user stay based on the location information, a database of nearby POIs, number of visits of POIs previously visited by the user or group members, POIs corrected or added by the user or group members.

As stated, at least some embodiments include sending a notification, a short message service (SMS), or emails to connected users for arrival and departure of user stays and other related information. For at least some embodiments, notifications can be sent via Apple® Push Notification Service (PNS) for iOS devices, Google Cloud Message® for Android devices, or other messaging services for mobile devices. Push notifications can also be sent via a persistent connection between a mobile device and a backend server. Alternatively, push notifications can be sent by mobile phone short message service (SMS). Also, push notifications can be sent by email.

For at least some embodiments, notifications are sent in real time. Notifications can be triggered by arrival and departure of a user stay. For example, when a user arrives at home, the system will send the user's connected users a notification with a message including the user's name, arrival time, arrived POI name (home in this example), and optionally POI address.

For at least some embodiments, notifications are triggered by user stays and sent by a backend system. Both the user who generates the user stays and the connected users who receive the notifications can control the notification delivery. They can control what user stays should trigger notifications. They can use a black list or a white list of POIs, POI categories, geographical regions, and time of day and/or day of week to specify what users should or should not trigger notifications. They can also control the delivery methods of notifications such as Apple PNS®, Google Cloud Message®, SMS, or email. For Apple PNS, they can customize the notification audio. For example, their mobile phone will use different audios to differentiate connected users or POIs.

For at least some embodiments, sharing the user stay includes displaying the user stay on a timeline to members of the group of users (for example, on group members' mobile devices) in which the timeline consists of a series of arrivals and departures of user stays of a user stay history of the user and a user stay history of the group of users and ordered by timing of the arrivals and timing of the departures. For at least some embodiments, the timeline includes an arrival portion that includes an arrival time, a point of interest (POI), and a user name of the user stay. For at least some embodiments, the timeline includes departure portion that includes an end time, a point of interest (POI), and a user name of the user stay.

For at least some embodiments, sharing the user stay includes displaying a timeline of arrivals and departures of multiple members of the group of user. For at least some embodiments, this includes merging events generated by the multiple members into a single event if user stays of the events are at a same POI during an overlapped period of time.

At least some embodiments further include detecting an arrival or departure of a POI (point of interest) associated with the users stay, wherein the detecting triggers user specified actions including at least one of displaying a note, prompting a TODO list, playing a recorded voice message, sending an email, making a phone call, or triggering actions on third party services, such as social websites like Facebook®, Twitter® or cloud services such as Dropbox®. For at least some embodiments, the user specified actions are specified by the user of the user stay or a recipient of the user stay using a white list of POIs, POI categories, geographic regions, time of day or day of the week, or usual or unusual user stay behavior patterns.

For at least some embodiments, identifying a POI (point of interest) for the user stay includes matching the POI with the user stay based on the location information, a database of POIs, number of visits of POIs previous visited by the user or group members, or POIs corrected or added by members of the group of users. At least some embodiments further include members of the group of users correcting selected POIs of other members of the group of users. For an embodiment, group members can correct user stays of other group members. For example, after notification the other group members can proactively provide corrective feedback to the user regarding the user stays of the user.

At least some embodiments further include sharing real-time location information including sharing a location of a mobile device of the user in transit between two user stays to group members. For example, the sharing device sends the location information continuously to a backend server. The recipient device obtains the real-time location of the sharing device by retrieving the location of the sharing device from the backend server. For at least some embodiments, sharing real-time locations includes initiating a sharing session. For at least some embodiments, initiating a sharing session sending a sharing request from a recipient device using push notification to the mobile device in transit, or maintaining a persistent network connection from a backend server to the mobile device in transit to wait for accepting a sharing request initiated from the recipient device. For at least some embodiments, sharing real-time location includes proactively initiating the sharing session by the mobile device in transit and constantly publishing location information to the server while in transit.

For at least some embodiments, users can establish connection groups based on their social connections. At least some embodiments include methods, systems, and apparatuses for automatically discovering nearby people that have installed the same application. The system then aggregates all such user's locations in a backend server. The backend server then sends nearby exposed user's location information to the user. The user's private information is not exposed. The user's full name and photos are also protected unless the user wants to expose them. If the user wants to establish a connection with a nearby user, the user can click a button to send invitation. The system is responsible for delivering the invitation to the nearby user.

For at least some embodiments, sharing the other location information includes performing a user stay behavior analysis of the user and performing a social behavior analysis of members of the group of users. For at least some embodiments, the user stay behavior analysis includes automatically identifying unusual user stay behavior of the users, such as visiting a never-visited place or staying at a place for unusually long time and then notifying group members about the unusual behavior. For at least some embodiments, the social behavior analysis comprises automatically identifying time of day, day of week, and duration that members of the group of users spend time together at the same place. For at least some embodiments, the user stay behavior analysis includes automatically identifying home and work places for the user based on user stay history of the user. For at least some embodiments, the user stay behavior analysis includes automatically identifying top places visited by the user and top places for a category visited by the user.

At least some embodiments include methods, systems, and apparatuses of user stay behavior analysis of individual users and social behavior analysis of a group of users. For at least some embodiments, the behavior analysis includes derivation of a user profile based on user stays of a user, which includes correlation of visited POIs, frequently visited POIs, top Places visited by the user, top places for a category visited by the user. Correlation of POIs includes the conditional probability that a user visits a POI and then visit another POI. Another embodiment includes observing the most frequent routes for a user to go from a POI to another POI. Further, minimum, maximum, average speed for a user to go from a POI to another POI can be observed. By aggregating user stays into regions, the time a user spends in different regions and how the spent time is distributed in time of day and/or day of week can be observed.

Behavior analysis can in turn be used to improve POI matching. For example, behavior analysis can show the time and the duration that a user goes to restaurant, gym, or a grocery store. Then, at POI matching stage, the corresponding POIs higher weight for selection based on the time of the user stay, the user's behavior pattern, and the category of a POI.

At least some embodiments include observation of social behavior patterns by conducting behavior analysis of a group of connected user. For at least some embodiments, social behavior analysis includes a method of automatically identifying time of day, day of week, and duration that group members spend time together at the same place. Thus a social behavior pattern can be utilized in POI matching. For an embodiment, when the group users visit to the same location at the same time, selecting the same POI for the users based on their historical social profiles is evaluated.

For an embodiment, user stay behavior analysis includes automatically identifying a user's unusual user stay behavior such as visiting a never-visited place or staying at a place for unusually long time and then notifying group members about the unusual behavior. For an embodiment, the system sends a notification, SMS, email to connected group members for the user's unusual behavior. This is useful, for example, for parents to protect their children.

For an embodiment, user stay behavior analysis includes automatically identifying home and work places for a user based on the user's user stay history. After a user starts to use the system for a few days, the system has collected some user stays for the user. An embodiment includes automatically detecting home and work place for the user based on user stays. Once the home or work places have been detected, the user can be prompted to confirm. Thus, the user does not need to manually enter home or work place. That is, the home and work places are automatically identified.

For an embodiment, detect the home includes first filtering all user stays to remove short user stays and long user stays that last for a few days. Then for each POI and all user stays of the POI, the total number of days that the user has user stays at the POI, is counted and named as total_days. Meanwhile, the number of midnights that the user has user stays at the POIs, is counted and named as midnight_days. If the ratio midnight_days/total_days is larger than a predefined threshold, then the POI is considered to be a home candidate. For an embodiment, from all home candidates, the one the user visited most often is selected as the home POI.

For an embodiment, to detect office, all user stays are filtered to remove short user stays and long user stays that last for a few days (or a threshold number of days). Then for each POI and all user stays of the POI, the total number of days that the user has user stays at the POI is counted and named as total_days. Meanwhile, the number of days that the user has user stays that can be considered as an office user stays is counted and named as office_days. To determine if a user stay is an office user stay, the total hours of the user stay in work hours, i.e., 8 am-18 am, Monday to Friday is divided by the total hours of the user stay. If the ratio is large enough, it is determined to be an office user stay. A practical ratio is 70%. Then, if the ratio of office_days/total_days is larger than a predefined threshold, it is considered to be an office candidate. For an embodiment, for all office candidates, the one the user visited most often is picked or selected.

For an embodiment, notifications are sent to a user when the user's home or office is detected. Further, notifications are sent to a user when the recommending the user to establish connections with some users based on their behavior pattern.

For at least some embodiments, determining the group of users (that is, for a group of connected users) includes automatically discovering nearby users and recommending the nearby users to establish connections to establish the group of users, wherein nearby is defined by a selected distance.

Figure 2:
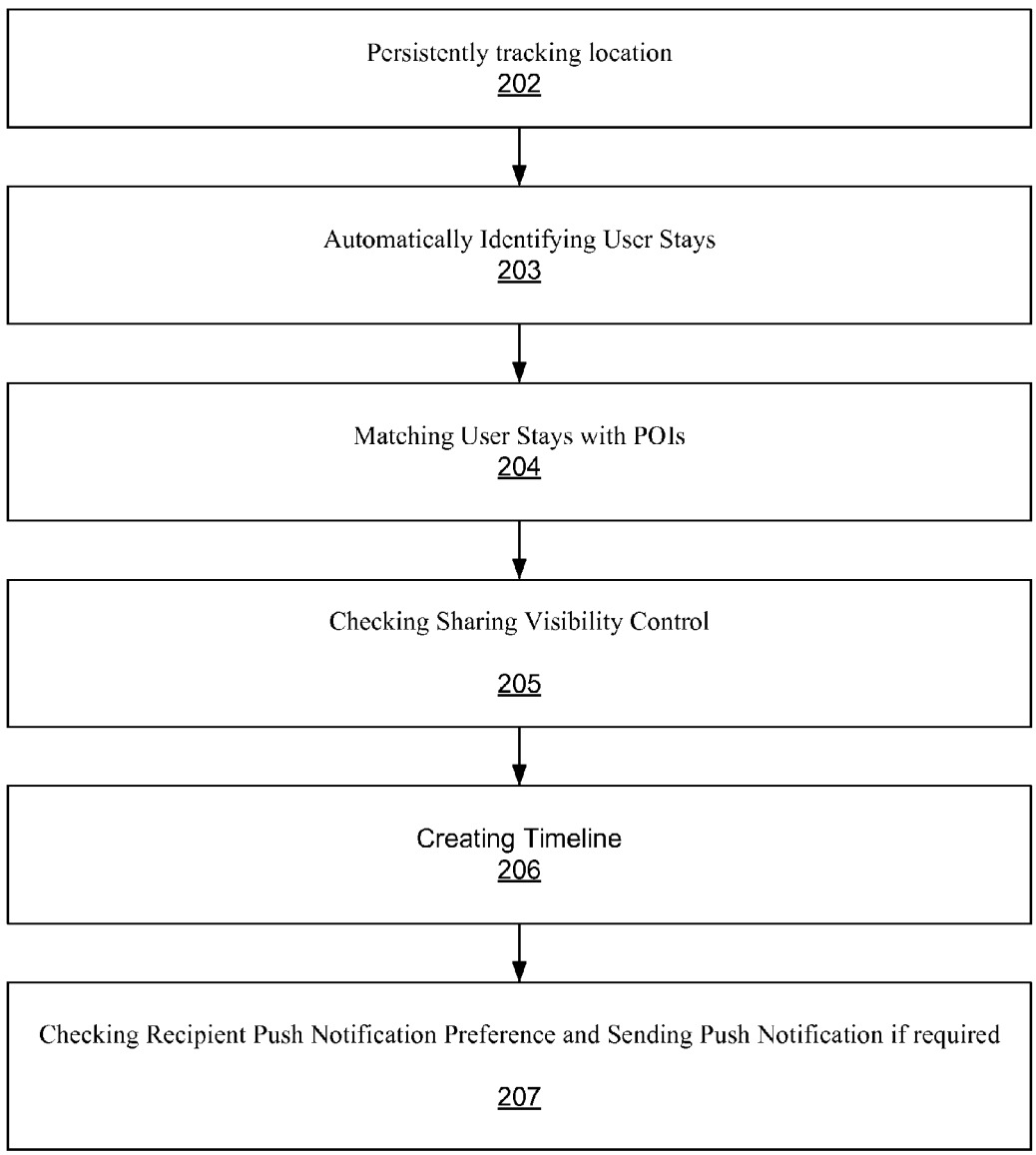
FIG. 2 is a flow chart that includes steps of a high-level processing flow of determining and sharing user stays of a user of a mobile device, according to an embodiment.

FIG. 2 is a flow chart that includes steps of a high-level processing flow of determining and sharing user stays of a user of a mobile device, according to an embodiment. That is, FIG. 2 illustrates the processing flow 201 of a system for detecting user stays of a mobile device of a user and sending notifications to a group of users for sharing the user stays. The workflow consists of starting a location manager on mobile devices to persistently track location 202. For an embodiment, the location manager is software running on the mobile device for collecting location data, which includes either GPS location data or network location data. To optimize power consumption, the location manager may be turned off and on from time to time. An embodiment includes automatically identifying user stays of the mobile device of the user 203 and selecting POIs to match identified user stays 204. Once a user stay is generated, the user's preferences are checked for sharing user stays 205. If the user prefers to stay in a private mode, the user stay is not shared. Otherwise, the user's connection group is checked to identify a group of users for sharing the user stay. For an embodiment, the user's connection preference are also checked for each connection in case the user does not want to share user stays with a specific connection. As the result, a group of users to share the user's user stay with is obtained. For an embodiment, a timeline entry for each user in the group 206 is created, which includes the user stay information. For an embodiment, a push notification is sent to each user in the group 207. For an embodiment, before sending a notification to a user, the recipient push notification preference set in advance by each user in the group is checked. For an embodiment, if a user in the group does not want to receive push notifications in general or does not want to receive push notifications from a specific user, the user's preference is followed and push notifications are not sent.

Figure 3:
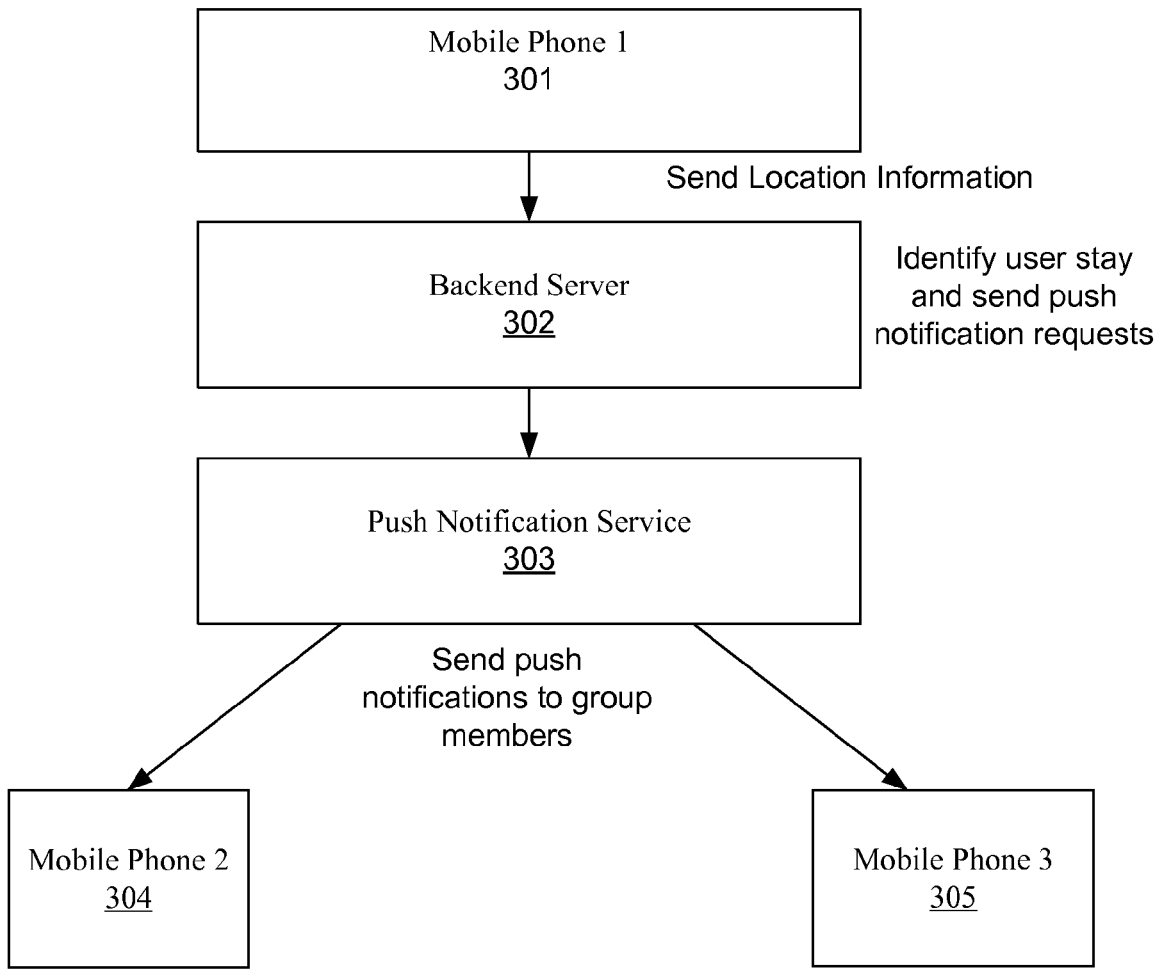
FIG. 3 is a flow chart that includes steps of a method of sending push notifications to members of a group of users, according to an embodiment.

FIG. 3 is a flow chart that includes steps of a method of sending push notifications to members of a group of users, according to an embodiment. That is, FIG. 3 depicts details of push notification flow from a mobile device that generates a user stay to mobile devices of connected users. For this embodiment, Mobile Phone 1 in 301 sends location information to Backend Server in 302. Backend Server in 302 detects a user stay and sends a push notification request to Push Notification Service in 303. Push Notification Service in 303 can be Apple Push Notification Service®, Google Cloud Messaging Service 200, or a proprietary push notification service. Push Notification service then sends push notifications to connected group members, in this case, Mobile Phone 2 in 304 and Mobile Phone 3 in 305.

Figure 4:
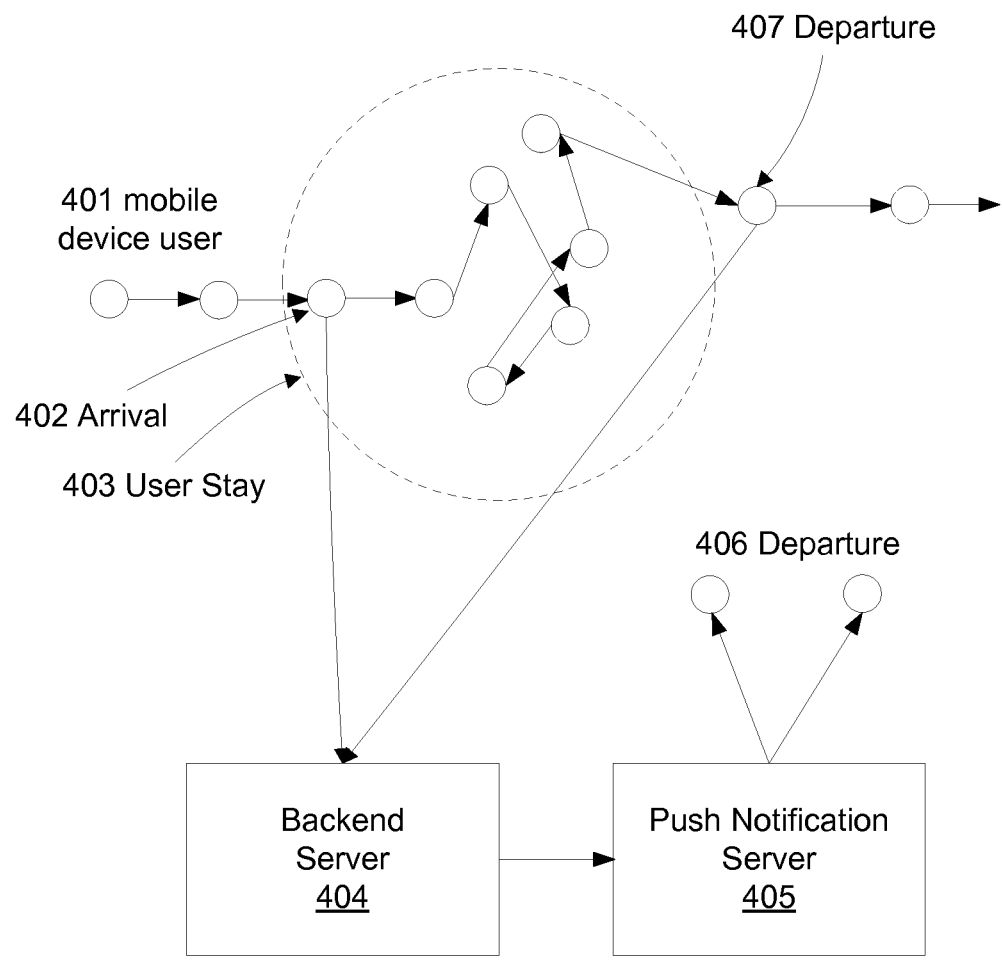
FIG. 4 shows a sequence of locations of a user of a mobile device, the determination of a user stay, and sharing of the user stay with members of a group of users, according to an embodiment.

FIG. 4 shows a sequence of locations of a user of a mobile device, the determination of a user stay, and sharing of the user stay with members of a group of users, according to an embodiment. That is, FIG. 4 illustrates how for an embodiment, user stays are detected and how notifications are triggered at arrival and departure location. A mobile device user moves forward in a direction in 401. In 402, the mobile device arrives at a place. The user then starts move around the place or stay there until the user departs from the place in 407. The system detects the user stay 403.

In FIG. 4, the user stays are detected by collecting the location information by the mobile device. For an embodiment, attempts are made to cluster location points collected so far and a centroid is computed based on the current cluster. For a new location point, the distance of the new location point to the current centroid is checked. If the distance is within a specific distance then add the new location to the cluster. If the distance is larger then the specific distance, then the cluster is closed. For each newly added location point, the duration between the start time (arrival time) and the time of current location of the cluster is checked. If the duration is longer than a specific minimum duration, then a user stay is detected. For an embodiment, a POI is identified for the user stay based on the location information and user stay history of the user or other connected users. If the cluster is closed, a new cluster is started from the departure point. The closed location point is the departure point.

For an embodiment, user stay detection requires a specific duration requirement. The duration can be customized by POIs or personalized for users. For example, if the user stay is for a user's home and office, the duration requirement can be very small. Thus, once a user arrives at the place, the user stay will be detected immediately.

For an embodiment, once the user stay arrival 402 is detected, the backend server 404 sends notifications to push notification server 405. The push notification server 405 sends the notifications to mobile devices of connected group members in 406. Similarly, once the system detects the user stay departure 407, the backend server 404 sends push notifications to push notification server 405. The push notification server 405 sends the notifications to mobile devices of connected group members in 406.

Figure 5:
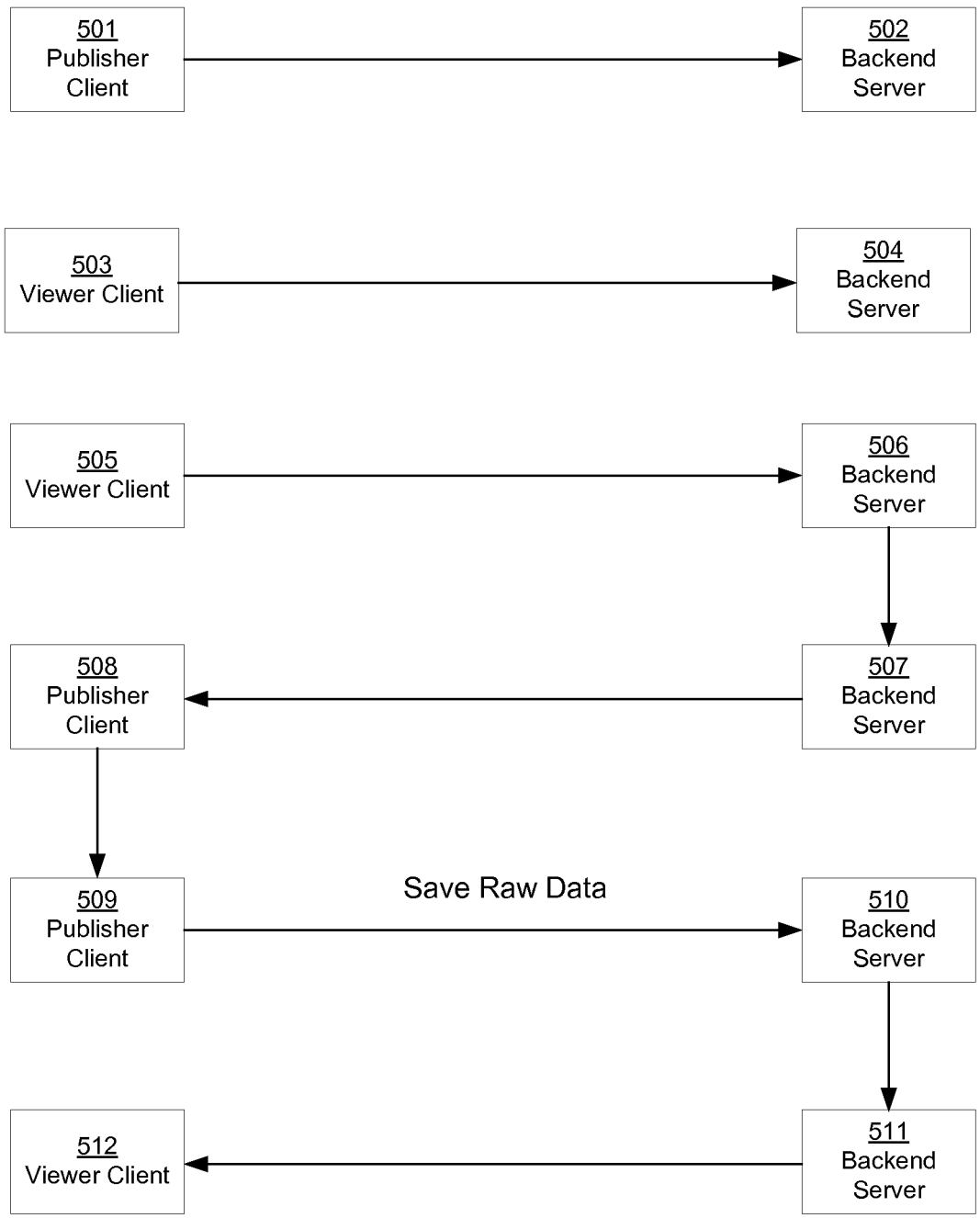
FIG. 5 shows a series of events included in the sharing of a user stay, according to an embodiment.

FIG. 5 shows a series of events included in the sharing of a user stay, according to an embodiment. That is, FIG. 5 demonstrates how to implement OTG (on-the-go) via persistent network connections. OTG refers to the user being on-the-go, and how to share location data of the user while or when the user is on-the-go. A protocol for persistent network connection is WebSocket®. The publisher client in 501 establishes a persistent network connection to the backend server in 502 and sends a register message to indicate its user ID, publisher_uid. Thus, the backend server can associate the connection with the publisher by the user Id. The viewer client in 503 also establishes a persistent network connection to the backend server in 504 and sends a register message to indicate its user Id, viewer_uid. The viewer client in 505 then determines to initiate an OTG on the publisher. Thus, the viewer client in 505 sends a subscribe message with the publisher user Id to the backend server in 506. The backend server in 507 identifies the connection from the publisher based on the publisher user ID and sends a pull message to the publisher client in 508. For an embodiment, the pull message contains the viewer UID and publisher UID. For an embodiment, after receiving the pull message, the publisher client in 509 starts OTG and sends raw data to the backend server in 510. Then the backend server in 511 sends publisher's raw data to the viewer client in 512 a push message containing the publisher user Id, the latitude and longitude of the raw data on publisher client, and the timestamp when the data was collected.

Figure 6:
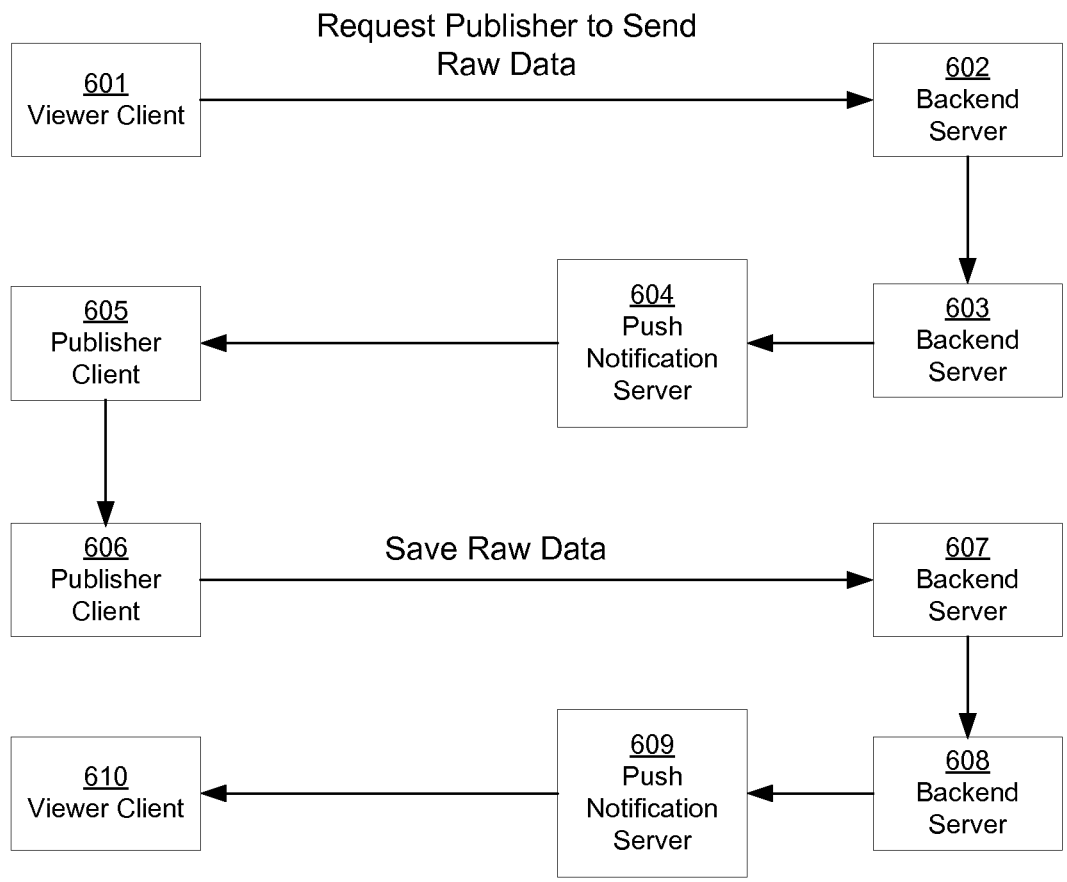
FIG. 6 shows a series of events associated with a push notification of a user stay, according to an embodiment.

FIG. 6 shows a series of events associated with a push notification of a user stay, according to an embodiment. That is, FIG. 6 illustrates an embodiment of how to deliver OTG via push notifications. A viewer client in 601 sends an HTTP request to the backend server in 602, requesting publisher to send raw data. The backend server in 603 sends a PNS request DATA_POST_REQUEST to the push notification server in 604, which forwards the PNS to the publisher client in 605. The publisher client then starts OTG state and sends raw data to the backend server in 607. The backend server in 608 then sends the raw data in a PNS request DATA_UPDATE to the viewer in 610 via push notification server in 609. Then, viewer client in 610 can show the publisher client's real-time location in timeline.

FIG. 7 shows a display of a user that includes a timeline of user stays of other users in a same group as the user, according to an embodiment. That is, FIG. 7 demonstrate an OTG event 701 in timeline, where Friend 6 is in OTG state since 9:10 am Feb. 10, 2014. The timeline can visualize the location with a map or conduct a reverse geocode to show the address of the location.

FIG. 7 illustrates sharing a user stay comprises displaying the user stay in a timeline on a mobile phone app. A timeline includes a series of arrival and departure events of user stays generated by group members and ordered by event generation time. An arrival timeline event includes the arrival time, the POI, and the user name of the user stay. A departure timeline event includes the end time, the POI, and the user name of the user stay. In FIG. 7, a friend named Friend 1 arrived at POI 1 at 08:00 am Feb. 10, 2014 in 705, and departed from POI 1 at 08:30 am Feb. 10, 2014 in 703. A friend name Friend 2 arrived at POI 2 at 08:10 am Feb. 10, 2014 in 704.

At least some embodiments include displaying the timeline of arrival and departure events of multiple group members including merging events generated by multiple users into a single event if the user stays of the events are at the same POI during overlapped period of time. In FIG. 7, Friend 3, Friend 4, and Friend 5 arrived at POI 3 almost at the same time (702). For an embodiment, the three arrival events are merged into a single time entry.

For at least some embodiments, a user stay is associated with some relevant information. For example, a user may wants to display a shopping list once the user arrives at a grocery store. The described embodiments include methods, systems, and apparatuses that can execute user specified actions such as displaying a note, prompting a TODO list, playing a recorded voice message, sending an email or SMS, or making a phone call once a user specified condition is satisfied. User specified conditions could be arrival or departure events. The conditions can also be arrival or departure events based on a specified list of POIs, POI categories, geographical regions, and time of day and/or day of week. More advanced triggering conditions can be based on unusual user behavior. For example, the condition can be that a user arrives at a place that the user has never been. On the other hand, user specified actions could be actions on third-party web services such as social websites like Facebook®, Twitter® or cloud services such as Dropbox®. User specified actions can be specified by the user who generates the user stay or the connected group users. Thus, a user can specify actions for any user in the connected user group. For example, a husband may want to remind his wife with a shopping list when his wife arrives at a grocery store. His wife may want to remind him with a message that he should buy some milk when he leaves his office.

The described embodiments include methods, systems, and apparatuses for sharing real-time location information comprises sharing the location of the mobile phone of the user in transit between two user stays to connected group members. The sharing phone sends the location information to a backend server. The recipient phone obtains the real-time location of the sharing phone from the backend server. The "real-time location data" can be referred to as "raw data".

As previously described, real-time location sharing can be referred to as OTG (on-the-go). For an embodiment, a mobile device of a user automatically starts OTG once it departs from a user stay. As a result, the mobile device will consume battery power. If no connected users want to view the user's real-time location at the time, the power consumption on the mobile device is a waste. The described embodiments further includes methods, systems, and apparatuses for saving power by triggering OTG only if a connected user is viewing timeline and the user has departed from a user stay and has not arrived at next user stay.

For an embodiment, a connected user who is viewing the timeline is referred to as the viewer. For an embodiment, a user who will share OTG locations is referred to as the publisher. To save the power, the viewer device initiates the OTG state on the publisher device by sending an OTG request to the publisher device via a backend server. For an embodiment, the condition to initiate an OTG is the viewer viewing the timeline and the publisher has departed from a user stay and has not arrived at another user stay. Once the publisher device receives the OTG request from viewer, the publisher starts OTG state and sends location data to the backend server. The backend server sends location data to the viewer device. The publisher device will be in OTG state for a period, for example, 5 minutes. The OTG state will expire after 5 minutes. The publisher device will stop collecting location data to save power. To continue OTG state, the viewer device has to repeatedly trigger OTG every 5 minutes if the viewer is still viewing the timeline.

For an embodiment, to deliver an OTG request to the publisher device, a push notification is sent to the publisher device. Besides push notification, the OTG request can be delivered to the publisher device by a persistent network connection between the publisher device and the backend server. The publisher device has to maintain a persistent connection to the backend server. Thus, the server can deliver the OTG request to the publisher device anytime. The publisher device may only establish a persistent connection to the backend server when it departs from a user stay. On the other hand, the viewer also needs to set up a persistent network connection to the backend server to receive the raw data sent from the backend server.

Additional Descriptions of User Stays

Figure 8:
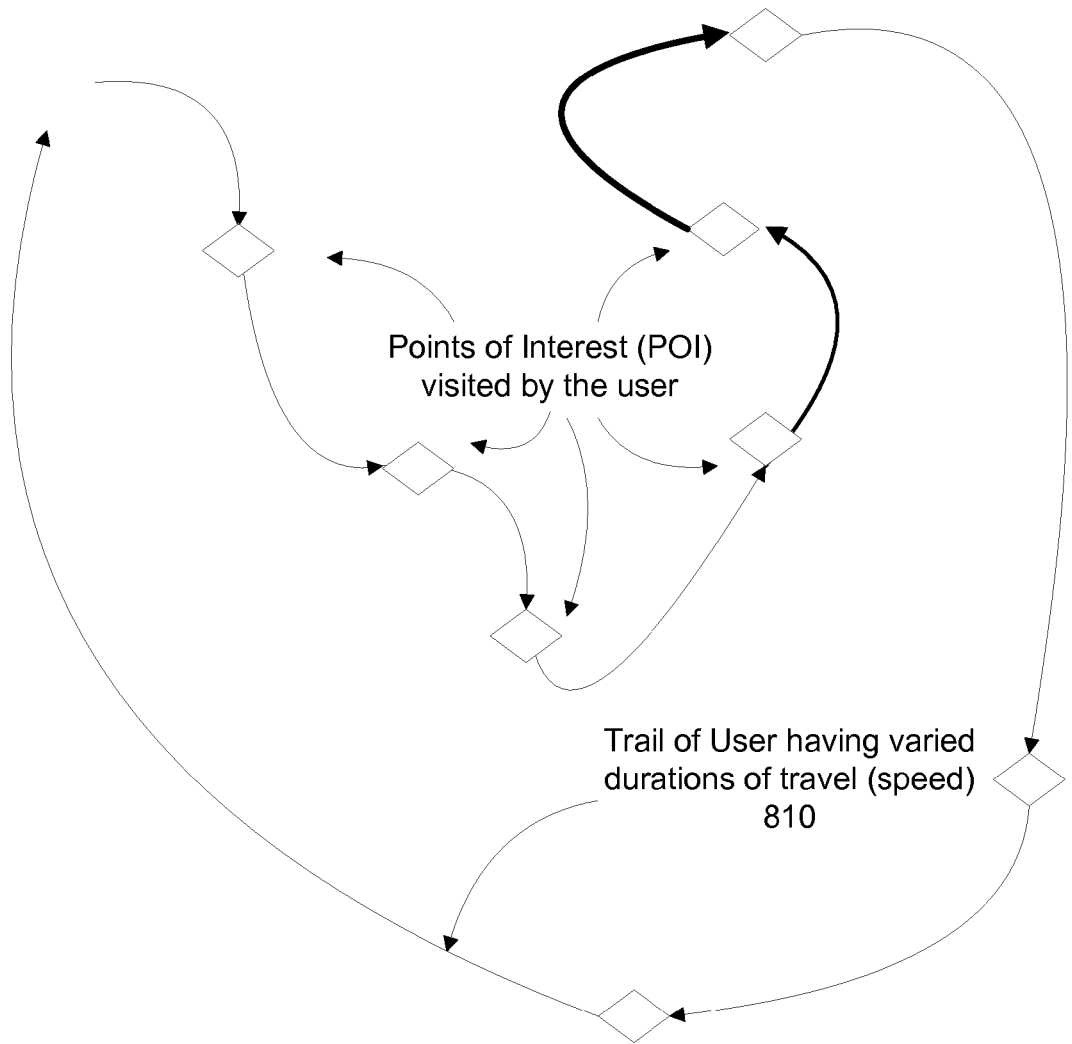
FIG. 8 shows an example of a map that depicts locations traveled by an individual that further depicts points of interest of the user.

FIG. 8 shows an example of a map that depicts locations traveled by an individual that further depicts points of interest (or user stays). A line 810 depicts the locations traveled by the user. During the travels of the user, the user visits various points of interest. Based on the visited locations, additional points of interest can be recommended and/or suggested to the user. The locations traveled and the time spent at or between locations can be used to identify user stays of the user.

The trail of the user can be marked by differing speeds (depicted by varying thickness of the line 810) of travel between points of interest. The travel speed can be used as one piece of information in the determination of trails of interest.

A series of points of interest (such as shown in FIG. 8) can be termed a "trail of interest". The trail of interest includes a sequence of location data points. Embodiments of each location data point can include the attributes of latitude, longitude, altitude, speed and/or a timestamp. More specifically, an embodiment of a trail of interest is defined by a plurality of points of interest of the user. For an embodiment, a frequency and/or speed of the user between points of interest is used to determine a level of importance of the trail. For example, if a user travels along one part of a trail (or route) frequently, with low speed (meaning it is a local street, rather than high way, which can be verified by using a geo-database), then some types of services along the this part of the trail can be recommended to the user, with the expectation that it is more likely for the user to use the service, because it is easier for the user to stop by the service. For an embodiment, the level of importance is included within a user profile.

Figure 9:
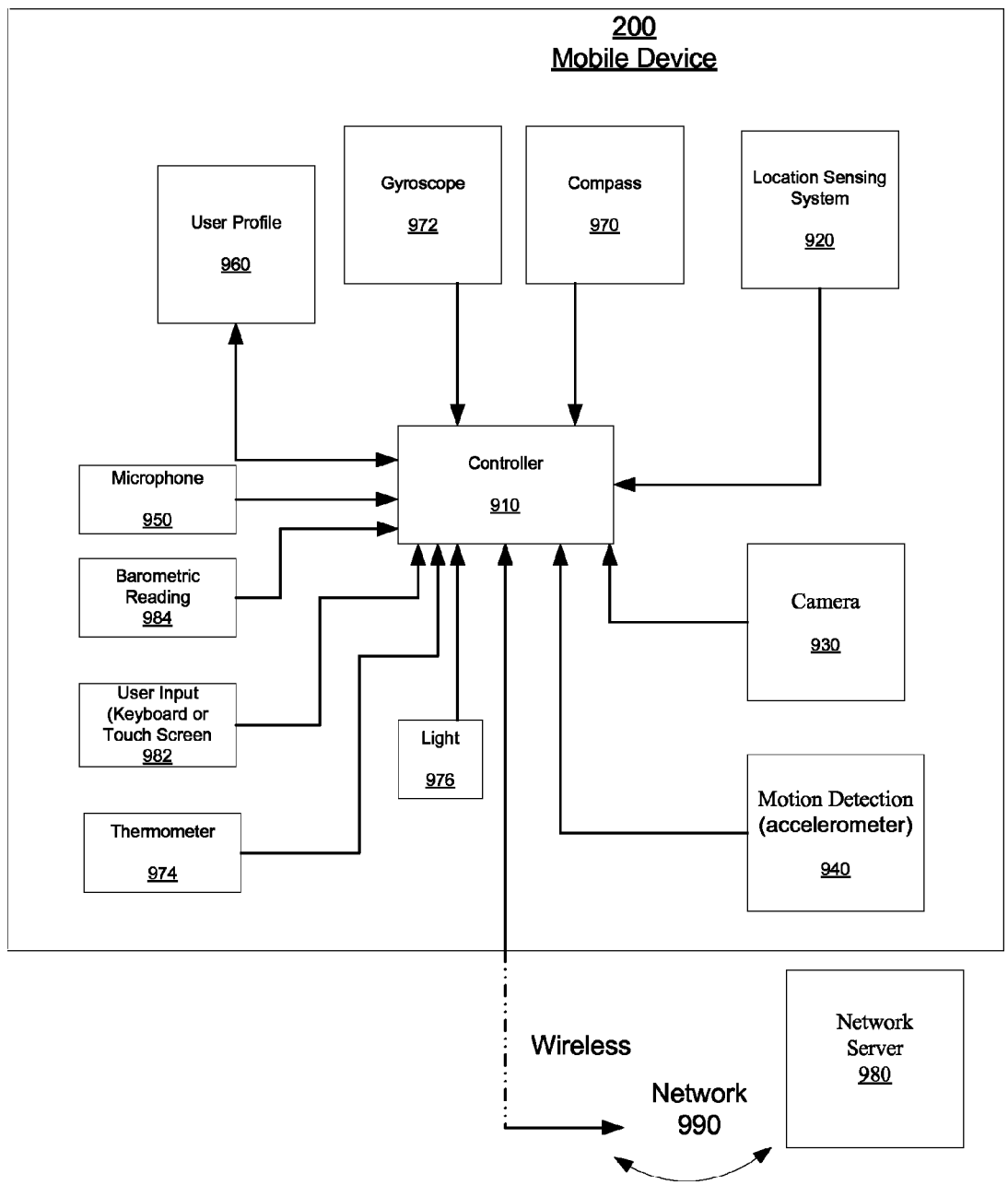
FIG. 9 shows an example of a mobile device that the disclosed embodiments for determining user stays of the user of the mobile device are operable, according to an embodiment.

FIG. 9 shows an example of a mobile device that the disclosed embodiments for determining user stays of the user of the mobile device are operable, according to an embodiment. For embodiments, user location data is continuously collected from the mobile device over time. The data can consist of multiple streams of sensor data with timestamps.

Spatial information (such as, longitude, latitude, altitude) of the user can be determined by a location sensing system, such as a global positioning system (GPS) 920 and/or network-based location, such as location determined by cellular and/or WiFi networks of the mobile device 900. Based on the spatial information, a controller 910 (or another controller connected to the controller 910) of the mobile device 900 can roughly determine locations of the user. GPS, however, can be limited because the exact location or the actual business (point of interest) visited by the user may not determinable from GPS alone. Embodiments provide alternate or additional pieces of location information as determined by the controller 910, or a controller electronically connectable to the controller 910.

Signals sensed by a motion sensor (for example, an accelerometer) 940 can be used to provide additional user-related information. That is, for example, the GPS 920 may be precise enough to narrow down the identification of a location of interest to three businesses. The signals generated by the motion sensor 940 can provide an indication of activity of the user, which can be used to additionally identify a location of interest. For example, when a department store (e.g. Walmart®) is located next to a cafe (e.g. Starbucks®), the user's motion pattern can be used to disambiguate between the two POI (points of interest), Walmart and Starbucks. If the user's motion pattern indicates that the user has been walking around most of the time, then the probability that the user visited the department store is higher. On the other hand, if the user's motion pattern indicates that the user has been sitting still most of the time, then the probability that the user visited the cafe is higher.

Images captured by a camera 930 of the mobile device 900 can be used to provide additional user-related information. That is, for example, signs on business proximate to the user's location can be used to determined points of interest.

Audio signals sensed by a microphone 950 of the mobile device 900 can be used to provide additional user-related information. That is, for example, loud noise versus quiet noise in the background of a user's location can be used to aid in determination of points of interest. For example, because the noise level in a library is usually low, if the noise level is low, then the probability that the user is in a library is higher than the probability that user is in a restaurant.

Direction of the user can be determined by, for example, a compass 970 of the mobile device 900. The compass 970 can provide present or historical directions of the user. The directions of the user can be used to aid in the determination of points of interest.

Rotation of the user can be determined by, for example, a gyroscope 972 of the mobile device 900. The gyroscope 972 can provide present or historical rotation of the mobile device of that the user carries. The rotation of the mobile device of the user can be used to aid in the determination of points of interest.

An ambient temperature of the user can be determined by, for example, a thermometer 974 of the mobile device 900. The thermometer 974 can provide present or historical ambient temperatures of the user. The temperature of the user can be used to aid in the determination of points of interest. For example, temperature can be used to determined whether the user is or was outside versus inside.

Exposure to ambient light by the user can be determined by, for example, a light sensor 976 of the mobile device 900. The light sensor 976 can provide present or historical light exposure of the user. The light exposure of the user can be used to aid in the determination of points of interest. For example, sensed levels of IR can be used to determine whether the mobile device of the user is, for example, in the user's pocket, and to determine whether the user is in direct sun light.

User-input information can be received from a key-board or touch screen 982. Based on a determination that the user is using the input (key-board or touch screen) behavior if the user can be inferred, and therefore, educated guesses can be made regarding the location of the user. For example, if the user is inputting information, the user is probably not driving. If the user is talking, the user is probably not at a movie theater.

Barometric information from a barometric sensor 984 can be sensed and used to determine user-related information. For example, the barometric information can be used to deduce an altitude of the user, and therefore, be used to determine what floor of a building the user is presently located. GPS can be inaccurate inside of buildings, and therefore, barometric information can be very useful.

A network 990 that the mobile device 900 is connected to, can provide additional user-related information. For example, a server 980 of the network can have street view images that provide additional information regarding a general location that a user is at. The connection to the remote server 980 is optional, because the mobile device may be disconnected from the server. In addition, part of the user profile 960 computation can be performed on the mobile device, and may not be required to be run on the server.

It is to be understood that the processing of the described embodiments for determining user stays can occur at the controller 910, at the network server 980, or at a combination of both the controller 910 and the network server 980. If the connection of the network 990 allows the location information to be properly uploaded to the network server 980, then nearly all of the user stay processing can occur at the network server. However, if the connection of the network 990 is not available, at least a portion of the user stay processing can occur at the controller 910 of the mobile device 900.

For at least some embodiments, one or more of the sensed states of a combination of the sensed states of the described sensors (920, 930, 940, 950, 970, 972, 974, 976, 982, 984) and/or network connectivity (990) are used in user stay determination. The sensed states of the sensors change over time. For an embodiment, patterns or a series of patterns in the one or more sensed states of the described sensors can be identified and/or recognized. For at least some embodiments, changes in the patterns indicate the user is arriving (start time) or departing (end time) a POI, or that the user is in transit between users stays or POIs. Therefore, for at least some embodiments, the information of the sensed states of the sensors can be used to determine user stays. For example, if the motion state (940) indicates that the user is stationary over a period of time, for at least some embodiments, this is used to identify the period of time as a potential user stay. If the network (990) is connected to a wireless station for a period of time, for at least some embodiments, this is used to identify the period of time as potential user stay. If a sensed light intensity of the light sensor 976 of the mobile device maintains a constant level (the same) of sensed light for a period of time, this information can be used to indicate a user stay. If the sensed temperature maintains the same level for a period of time, that information can be used to indicate a user stay.

Figure 10:
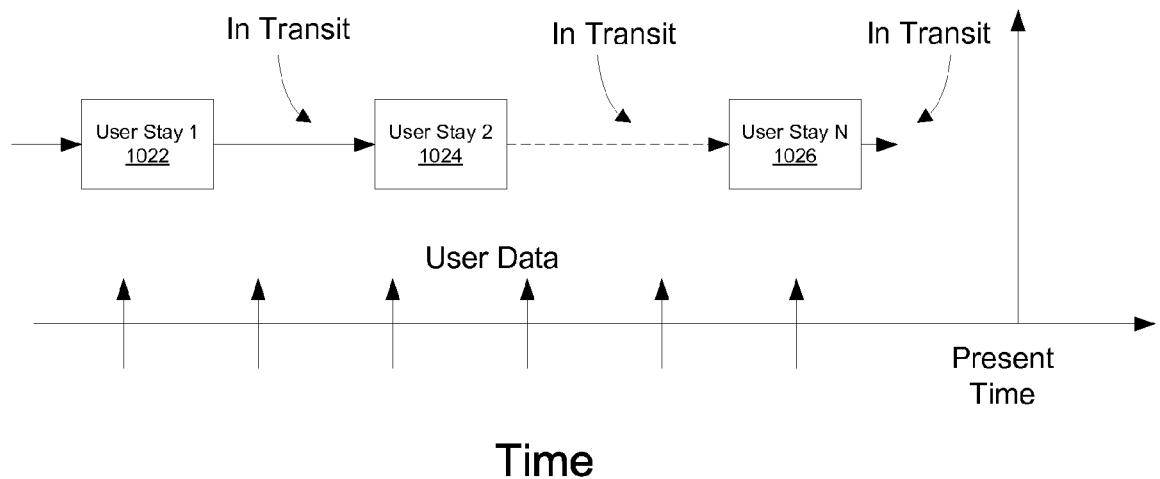
FIG. 10 shows a time-line of locations of the mobile device, which can be used for determining user stays of the user of the mobile device, according to an embodiment.

FIG. 10 shows a time-line of locations of the mobile device, which can be used for determining user stays of the user of the mobile device, according to an embodiment. As shown, a sequence of user stays 1022, 1024, 1026 are identified based on location data sensed by the mobile device while the mobile device and the user of the mobile device are in transit.

As shown, user data (including at least location data) is sensed over time. As will be described, based on the user data, user stays are identified. As shown, user stays are typically separated by "in transit" times, wherein the user is in transit between user stays.

Once a user stay is detected, events can be triggered on the mobile device, remote network, or other mobile devices. For example, for at least some embodiments, once the mobile device arrives at a POI or departs from a POI as determined by the detected user stays, a SMS message, a push notification, or an email is sent to other mobile devices that have subscribed to be notified by this type of user stay detection event. For at least some embodiments, detected user stays are organized and saved as a journal of places that have been visited. For at least some embodiments, detected user stays are shared or published in social networks. For at least some embodiments, user stays detected from multiple users are used to detect if the users (that is, multiple connected users) have been at the same place. User stays generated by massive numbers of users can be used to trace the propagation of infectious disease among the users.

Figure 11:
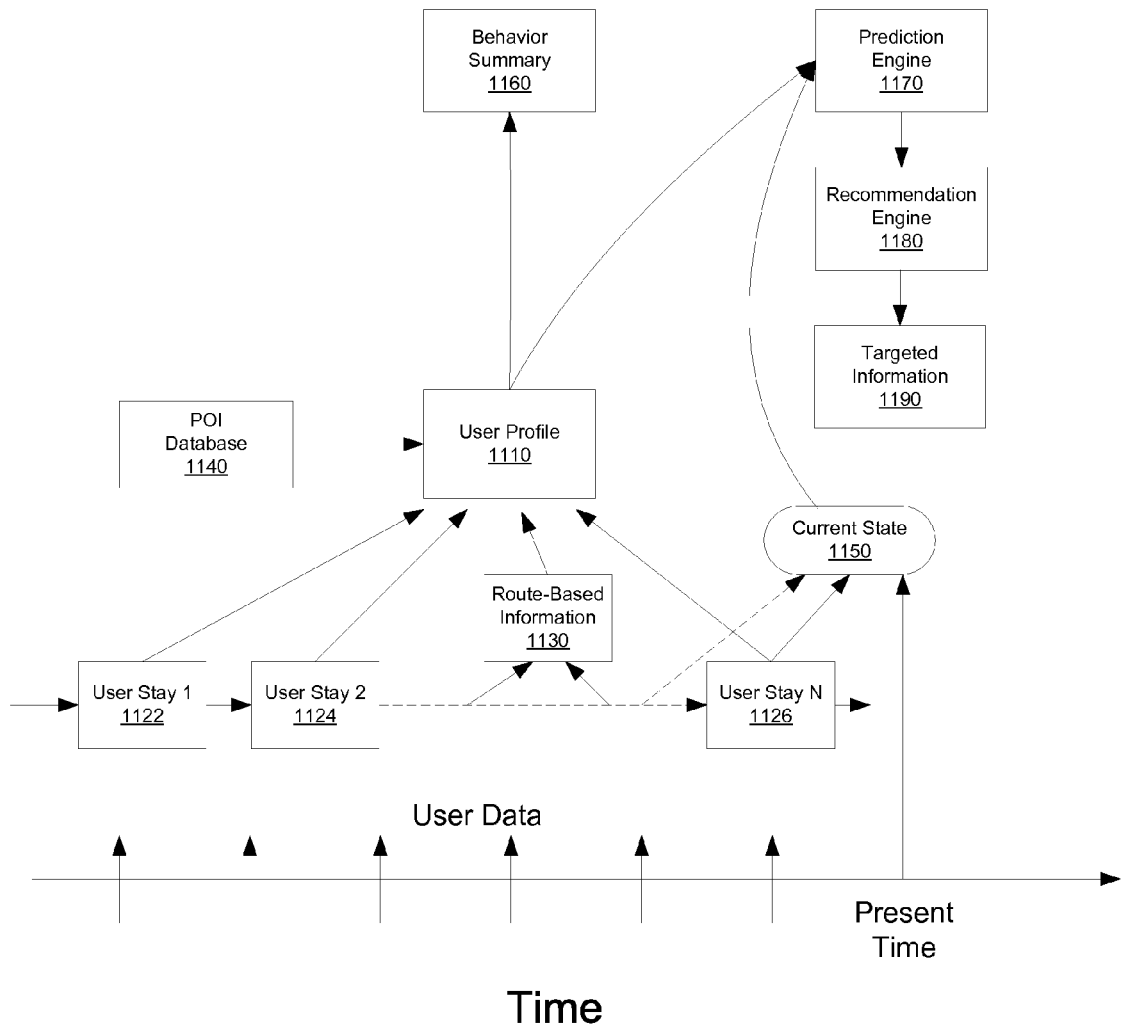
FIG. 11 shows a time-line of user stays of the mobile device, which can be used for providing services to the user of the mobile device, according to an embodiment.

FIG. 11 shows a time-line of user stays of the mobile device, which can be used for providing services to the user of the mobile device, according to an embodiment. The previously described user stays (such as, user stays 1122, 1124, 1126) are generated over time by the historical user location data, in which, for at least some embodiments, each is referenced to a POI in a POI database 1140. Route-based information 1130 can be inferred from historical commuting behavior of the user moving from one POI to another POI. Embodiments includes a user profile 1110 that is generated and continuously updated based on, for example, POIs from a POI database 1140, the user stays 1122, 1124, 1126 and route-based information 1130. A user profile is generated by analyzing all user stays of the user and extracting user behavior patterns. The user profile 1110 can be used to generate a behavior summary 1160 of the user of the mobile device. Behavior summary of a user can be created based on the user profile, at a daily, weekly, monthly or yearly basis.

In addition to the user profile 1110, embodiments further include determining a current state 1150 of the user of the mobile device. As shown, an embodiment of the current state is based upon current user stay information 1126 and/or recent user stays, and current user data.

Based on the user profile 1110 and the current state 1150, predictions of the behavior of the user can be made by, for example, a prediction engine 1170. Prediction engine 1170 takes static inputs from the user profile 1110, such as frequently visited POIs and transitional patterns between POIs, and dynamic inputs from the current state 1150 to infer the routes the user may take and POIs the user may visit in the future. Based on the predicted behavior, recommendation can be provided to the user via recommendation engine 1180 and targeted information 1190 can be provided to the user of the mobile device. The prediction engine 1170 can be disabled so that the recommendation engine 1180 can make targeted information based on the user profile 1110 and the current state 1150 directly.

An embodiment includes tracking a current state of the user. For embodiments, the current state includes user stays within a predetermined time of a present time, wherein the predetermined time is dependent upon an application of the user device or an observed behavior of a user of the user device.

For at least some embodiments the user profile includes a history of the user stays of the user. For an embodiment, the user stay includes the point of interest the user has visited, an arrival time and a length of time the user stays at the point of interest.

At least some embodiments further include determining route-based information. Further, embodiments include updating a current state of the user based on the route-based information. Another embodiment further includes predicting future user stays based on the route-based information. Embodiments of determining route-based information include determining a plurality of points of interest, wherein the plurality of points of interest define a trail of interest of the user. As previously described, an embodiment a trail of interest is defined by a plurality of points of interest of the user. For an embodiment, a frequency and/or speed of the user between points of interest is used to determine a level of importance of the trail.

At least some embodiments further include providing the user with targeted information base on the user profile. For specific embodiments, the targeted information includes at least one of coupons, advertisement, notices of events. Other embodiments include estimating a likelihood of conversion of targeted advertising based on the user profile, and/or measuring a conversion of targeted advertising based on the user profile. Additionally, a rewards-based program can be facilitated based on the user profile. That is, visits to a merchant can be monitored, and rewards automatically applied based on visits to the merchant.

For an embodiment, the user profile is supplemented based at least in part on websites visited by the user. For one implementation further includes supplementing the user profile based on information posted by the user on at least one of the websites. For another implementation, at least one of the websites comprises a social website.

Embodiments include providing the user with suggestions. For example, one embodiment includes providing the user with at least one suggestion based on identified points of interest. Another embodiment includes providing the user with at least one suggestion based on at least one predicated future point of interest. Further, embodiments include modifying (including changing or removing) a suggestion based on the user location history and user profile.

For at least some exemplary embodiments, route-based information is defined as the name of each route a user takes, the route usage frequency, the time when the route is usually taken, and the general speed information on the route.

Embodiments include a prediction engine that processes dynamic inputs from the user profile of a user and current state of the user to infer future POIs the user may visit and the routes the user may take. The prediction results can be used for providing targeted information to the user.

Once the profile has been created, the user can be provided with targeted information based on the user profile. Additionally or alternatively, a likelihood of confirmation of targeted advertising based on the user profile can be estimated. Additionally, the user profile can be supplemented based at least in part on websites visited by the user.

Embodiments include providing the user with at least one suggestion based on the identified points of interest. For an embodiment, this includes providing the user with at least one suggestion based on at least one predicated future point of interest. For an embodiment, a suggestion is modified based on the user profile. For example, a user profile could be used to determine that a user has already satisfied the condition of the suggestion because profile of the user suggests the user has already visited the appropriate location. Clearly, modifying can include changing or removing the suggestion.

As an example of the use of suggestions, a user's shopping list can be tracked, and the items on the shopping list can be correlated with the shops (special POIs) the user usually visits. When the user is physically close to a shop that has one or more items on the user's shopping list, a suggestion can be generated to remind the user to stop by the shop to purchase the item.

After such a suggestion is generated, the mobile device monitors the user's location history, and if it detects that the user stops at the specific shop, where a specific item on the shopping list has been in one of the suggestions presented to the user, the system can automatically remove the specific items, or reduce the priorities of those items.

Examples of intelligent personal services include spatial suggestions. An exemplary spatial suggestion includes a reminder to a user of a mobile device that is based on spatial information of the mobile device. Reminders include suggestions that are useful to the user. Intelligent personal services include, for example, making health-related suggestions, such as doing more physical activities (e.g. walking) than sitting still. Embodiments of personal services include providing recommendations or suggestions to the user based on the user's habits and interests, for example, kid-centric events during a weekend for people with children. Services can also include commercial services, such as recommending a cheaper gas station near the user's regular commute route.

Location based user behavior analysis can also be useful to a mobile advertiser. For example, after a mobile advertiser has displayed an advertisement to a user, the advertiser would like to determine if the user has been to the merchant in the advertisement and conducted business, and determine if the advertisement has been confirmed. Additionally, advertisers desire user profile information, which enables the advertiser to intelligently send targeted advertisements.

When, for example, the system detects that the user often goes to an elementary school or a child day care center, the system infers that the user may have one or more children, then the system may generate targeted information to the user for child-related events.

After the system detects the user usually go to a local public library on Saturday morning, the system can automatically generate a suggestion on Saturday morning when the user leaves home to remind the user to bring the books to return to the library.

The system tracks when the user gets gasoline for his car, and tracks the number of miles the user has driven the car after each refill. When the system detects that the user has used most of the gasoline in his tank based on the number of miles driven and the speed, as a result of the road type, such as local streets or high ways, the system can start to find gas station with low prices and make targeted information to the user.

Figure 12:
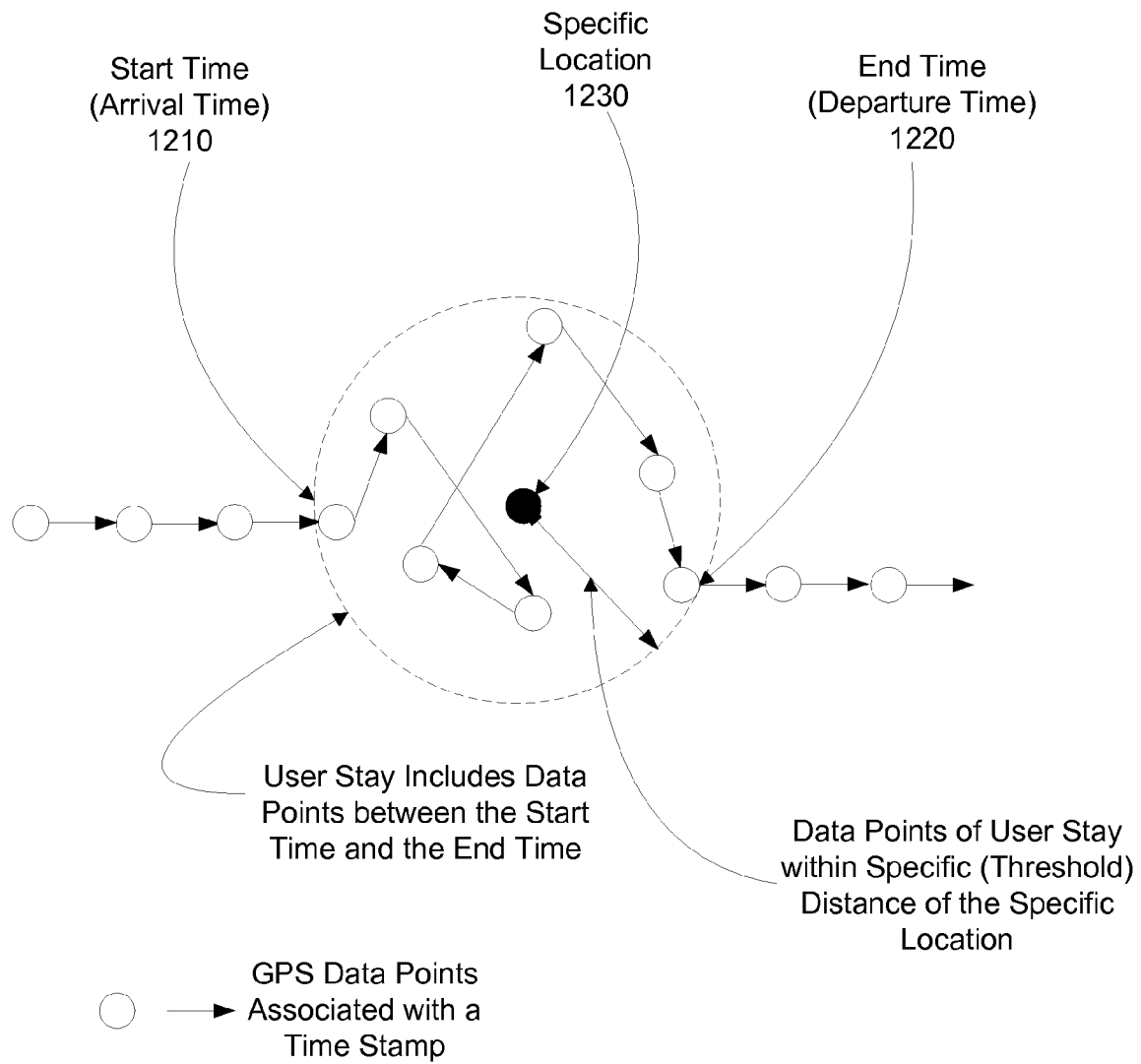
FIG. 12 shows a time sequence of location data points that are used to identify a user stay, according to an embodiment.

FIG. 12 shows a time sequence of location data points that are used to identify a user stay, according to an embodiment. The time sequence includes successive location (for example, GPS) data points. For the sequence of location data points, a user stay can be calculated. The user stay includes all location data points between the determined start time 1210 and the determined end time 1220. For an embodiment, the location data points within the user stay are all located within a specific distance of a specific location 1230 for at least specific minimum time duration based on the location information. Further, the start time 1210 of a user stay is determined based on the location information, the specific location 1230 and the specific distance, and the end time 1220 of the user stay is determined based on the location information, the specific location and the specific distance.

Various embodiments as will be described include calculation or determination of the specific location. For an embodiment, the specific location is determined based on a statistical analysis of a running set of location data points. Further, the specific distance can be set by a predetermined threshold. Further, the specific minimum duration of time can be set by a predetermined threshold. For at least some embodiment, the threshold of the specific distance and the threshold of the minimum time duration are adaptively selected based on candidate POIs associated with the specific location.

As mobile devices with GPS sensors become increasingly pervasive, it has become very useful to track a user of a mobile device and determine where the user has spent time during, for example, a day. The described embodiments acquire a user's location data and automatically detect his places of interest or significance.

For at least some embodiments, user data (including at least location data) is collected by a small program running on the mobile device and transferred in a format of (such as, current time, current location coordinate, estimated accuracy of that location coordinate) as best as can be determined by the mobile device. As described, the location data can include information from cellular and WiFi networks as well as GPS location points. For at least some embodiments, the collected user data is stored in a database, and can be processed later in batch mode.

Place Acquisition

For an embodiment, during place acquisition, the input track points (location data points) are processed, generating a set of user stays including a starting time, a duration, and a centroid point that is centroid of the user stay. Place acquisition includes processing of the input track points first by ordering them according to their time stamps. Outliers due to noise in the location determining devices are removed, and the remaining track points are then sent through a segmenting process. Each candidate user stay produced by segmentation is adjusted in a massaging process. After massaging, smaller segments are filtered out. A centroid for the surviving user stay is computed along with its duration. Finally the user stay is output as detected place results.

For at least some embodiments, outlier removal is performed by fitting an empirical distribution (such as Gaussian) to the data in terms of GPS speed, 2-D spatial location (latitude, longitude), and GPS accuracy. The data points lying outside of a certain range ($95^{th}$ percentile, for instance) will be removed from further analysis. The outliers or series of continuous groups of outliers that are removed are actually summarized and attached to the non-outlier point as prefix and suffix.

For at least some embodiments, segmentation is executed as a state machine. The initial state is outside. Each track point is examined in chronological order. Upon satisfaction of a set of conditions, which can be referred to as "arrival conditions", a state change is triggered that corresponds to arrival (start time) of a user stay. The state is then determined to be "inside" the user stay. On arrival, the segmentation algorithm continues to examine data in chronological order. However, the set of conditions being tested is a different set. The different set of conditions is testing departure (end time) and the conditions can be referred to as "departure conditions". When the current state is inside, and departure condition is triggered, the state is changed to outside. The series of track points with "inside" state is passed onto the next step.

Arrival (Start Time)

At least some of the described embodiments include a forward-looking criterion to determine arrival into a user stay. For this embodiment, a forward look in time and a predetermined time period are used at each track point (which is also an instant in time), to compute an arrival (start time).

For an embodiment, a smoothed speed is observed to determine whether it is slow enough. For an embodiment, the smoothed speed at a track point is the average speed of the device as calculated based on GPS distance and time elapsed during a predetermined time interval (such as, 5 minute interval) around each point.

For an embodiment, a bearing deviation is observed to determine whether it is large enough. For an embodiment, the bearing at a track point is the angle between two segments. One segment is from the last track point to North Pole. The other segment is from the last track point to the current track point. The standard deviation of this number during that predetermined time period is the bearing deviation.

For an embodiment, absolute steering is observed to determine whether it is small enough. For an embodiment, the steering is the bearing at the current track point minus the bearing at previous track point. The average of the absolute values of this number during the time window is the absolute steering.

For an embodiment, the leading trail is observed to determine whether it is straight enough. For an embodiment, straightness of the trail is measured by $r^2$ from regression where latitude is dependent variable and longitude is independent variable. The closer $r^2$ is to zero the straighter the trail is.

For an embodiment, identifying an arrival (start time) includes determining that the leading trail has small enough complete, single, average, or quartile linkage distance. For an embodiment, the linkage function includes calculation of a user stay quality metric. For an embodiment, a user stay is hypothesized to exist during a leading period of time that is either determined by a fixed time period or including contiguous points all of which are within some distance of the current track point. This hypothetical user stay is then used to produce the desired metrics. For an embodiment, the desired metrics includes an average distance of all track points from median user stay locations. For an embodiment, the desired metrics includes an average distance of all track points from centroid of the user stay. For an embodiment, the desired metrics includes a maximum distance of all track points from median user stay location. For an embodiment, the desired metrics includes a minimum distance of all track points from median user stay location. For an embodiment, the desired metrics includes a maximum distance of all track points from centroid of the user stay. For an embodiment, the desired metrics includes a minimum distance of all track points from centroid of the user stay. For an embodiment, the desired metrics includes a median distance of all track points from centroid of the user stay. For an embodiment, the desired metrics includes a median distance of all track points from median user stay location. For an embodiment, the desired metrics includes a 95 percentile of distances of all track points from centroid of the user stay. For an embodiment, the desired metrics includes a 95 percentile of distance of all track points from median user stay locations.

For an embodiment, identifying an arrival (start time) includes determining that the surrounding trail is straight enough. For an embodiment, track points from a fixed time window before and after the current track point are used in a calculation of correlation between latitude and longitude. This correlation indicates how near to a line these points lie on. A score of 0 means they are co-linear. The surrounding trail being straight indicate that the current track point is in the middle of traveling and therefore not a good entrance point into a user stay.

In addition to forward looking computation, at least some embodiments also backtrack by looking backwards in time from the current track point. For a backtrack computation, for at least some embodiments, the acceleration in the past period must be small enough (in fact, negative enough). For an embodiment, the acceleration at the current track point is approximated by first calculating speed using the distance and time between each track point and the previous track point. The change in speed between the current track point and previous track point is the computed acceleration. The computed accelerations in the past minute is averaged and used as the smoothed acceleration. If the smoothed acceleration is small enough or negative, then it can be determined that the user has enter a user stay.

For an embodiment, a GPS receiver is turned off, or put in a standby mode due to lack of motion. If the GPS receiver has been turned off by the client system, then it is likely that the user has entered a user stay. The client system (mobile device) attempts to conserve energy when the user is stationary. So this state change can trigger an entrance (start time) to a user stay.

For an embodiment, arrival (start time) is triggered when the disjunction of each of above logics is true and the current track point must have valid GPS signal. The selection of track points into acquisition of user stays and calculation of centroid points is based on accuracy and the status of GPS or network location status.

Departure (End Time)

Once inside the candidate user stay and the arrival (start time) triggered, a set of conditions is checked, and whenever one of them matches, the candidate user stay is determined. An embodiment includes backward looking conditions used for terminating the candidate user. For an embodiment, this includes determination of whether the motion is linear enough. For an embodiment, the latitude-longitude correlation of high quality points within the candidate user stay should be small or else departure (end time) is triggered.

For an embodiment, identifying the departure (end time) includes determining whether the current point is far enough from the candidate user stay using quartile linkage distance. For an embodiment, the distance from current track point to every track point in the candidate user stay is computed. The 95 percentile is compared with a constant and departure is triggered when current point is too far from the preceding candidate user stay.

For an embodiment, identifying the departure (end time) includes determining that the speed of the mobile device is too fast. That is, if the current smoothed speed is high then departure is triggered.

For at least some embodiments, forward looking conditions are used for terminating the candidate user stay, and identifying a departure (end time) of the user stay.

For an embodiment, identifying the departure (end time) includes determining that the bearing of the mobile device is uniform enough. The steering is uniform enough.

For an embodiment, identifying the departure (end time) includes determining that the GPS receiver is in an inaccurate state. If the average accuracy of GPS points within the current candidate user stay is too high then the algorithm triggers departure from the candidate user stay.

For an embodiment, a signal gap in the received GPS signal is monitored and detected. That is, if the GPS receiver is turned off for long enough (that is, greater than a selected time period threshold) then the candidate user stay is terminated, and the departure (end time) identified.

For an embodiment, the distance of the mobile device from the candidate user stay is monitored. That is, the distance from current track point to each track point in the candidate user stay is computed. The $90^{th}$ percentile is used as a measure of the distance from the current track point to candidate user stay. If this distance is too far then the candidate user stay is terminated.

For an embodiment, the distance from Candidate user stay to the next possible user stay is monitored. That is, for an embodiment, a future possible user stay is hypothesized based on distance from the current track point. The median distance of each track point in the candidate user stay and each track point in the hypothesized user stay is computed. If this distance is too large then the current candidate user stay is terminated, and the departure time (end time) is identified.

After detecting the user stay by arrival/departure logic, for at least some embodiments, each user stay is massaged in the sense of removing excessive time periods based on the device GPS state as well as the reported accuracy and distance relative to all other points and relative to the centroid points computed in previous step. In particular, the track points that are deemed to have high accuracy are discarded if they are far enough from the other points or the centroid point.

Centroid Point Calculation

For at least some embodiments, a final step in user stay acquisition is the determination of a centroid point. At least some embodiments include the use of a variety of methods for determining this centroid point to a user stay. Before this centroid point is computed, a filter can be applied to select the points to be included in this calculation. One or more algorithms can be applied to the data points to allow computation of the final centroid point from these filtered points.

For an embodiment, the centroid point to the user stay is computed as coordinate-wise median of the track points remaining after filtering. This is an efficient, robust and effective approximation of the centroid point of each user stay.

For an embodiment, the centroid point to the user stay is computed as coordinate-wise mean of the track points remaining after filtering. This is an efficient, robust and effective approximation of the centroid point of each user stay.

For an embodiment, the centroid point to the user stay is computed as a weighted average of the track points remaining after filtering. For at least some embodiments, the weight given to each track point is computed based on one or more of an accuracy of the location data for this track point, and a state of GPS and location determining device. An embodiment includes a symmetrically decayed weight that falls off as an exponential function of the time from a specified point in time. An embodiment includes determining a time elapsed since or to the absolutely closest time within the user stay whence there is a GPS data point. An embodiment includes determining the linearity of track points immediately preceding and following the current point. An embodiment includes determining the time distance from the chronological center of the current user stay. An embodiment includes determining the time from the current GPS track point to the next GPS track point.

Time Weighted Centroid

At least some embodiments include the calculation of a time weighted centroid. For an embodiment, the centroid of a user stay is calculated by giving a different weight to each GPS point that belongs to the user stay. For an embodiment, the weight for each point is determined by the time duration in which it is believed that the GPS measurement remains valid.

For an embodiment, the weight is assigned as $W(n)=T(n+1)-T(n)$, where $T(n)$ and $T(n+1)$ are the sample time for $P(n)$ and $P(n+1)$, respectively, if a GPS point $P(n)$ is followed by another GPS point $P(n+1)$. For an embodiment, the weight is assigned as $W(n)=T\_gps\_off-T(n)$, where $T\_gps\_off$ is the time when client switches to the GPS OFF state, if a GPS point $P(n)$ is the last one for the stay. For an embodiment, the time weighted centroid is calculated as Latitude_of_Centroid=Sum (Latitude(i)*(i))/Sum(W(i)), and Longitude_of_Centroid=Sum(Longitude(i)*W(i))/Sum(W(i)), where i=0, 1, ... N.

For an embodiment, the time interval between two GPS points is assigned to the two GPS points equally divided, i.e. half-by-half, if nothing is known about how the GPS points were collected. However, for at least some embodiments, the mobile device (client) avoids collecting location data (such as, GPS samples) unless necessary. Therefore, an embodiment includes weighting to give bias to the GPS sample preceding the time interval.

Massage and Merge

After user stays have been identified per the described embodiments, at least some embodiments include further massage processing the detected user stay candidates. For an embodiment, massage processing includes finding the first and last trustworthy track point in the user stay. For an embodiment, trustworthiness is a function of the source of the track point's location (GPS, WiFi or network) and the accuracy reported by that device. A centroid is computed at this moment using only track points between the first and last trustworthy track point, inclusive. The massage processing then proceeds from the very start of user stay and removes track points that are too far from the centroid computed in this stage of massage processing. The iteration terminates when the first trustworthy point is reached. In similar fashion, massage processing operates on end of the user stay. The massage processing includes inspection of track points from the very end of the user stay, removing points that are too far from the centroid computed in this stage of massage. The iteration, again, terminates when the last trustworthy track point of the user stay has been reached.

After massage processing, candidate user stays that last less than a predefined time duration are removed. Next, candidate user stays are checked for intersection in terms of time. For an embodiment, if there is intersection in the time periods of two user stays, the two user stays are merged. If multiple user stays intersect in time, they are merged together.

Lastly an iterative processing repeatedly merges user stays that precede and follow each other immediately. The iterative processing terminates when no merge happens during the iteration. Two user stays are merged if they are close in time (for example, within certain minutes of each other) and that they are within close proximity of each other. For at least some embodiments, the proximity of two user stays is determined based on the closest distance between any two track points drawn from each user stay. For at least some embodiments, the proximity of two user stays is determined based on the furthest distance between any two track points drawn from each user stay. For at least some embodiments, the proximity of two user stays is determined based on the median distance between pairs of track points drawn from each user stay. For at least some embodiments, the proximity of two user stays is determined based on the average distance between all pairs of track points drawn from each user stay. For at least some embodiments, the proximity of two user stays is determined based on the distance between the weighted centroid of the two user stays.

For at least some embodiments, the results of merge processing are user stays that require re-computation of their centroid location.

Figure 13:
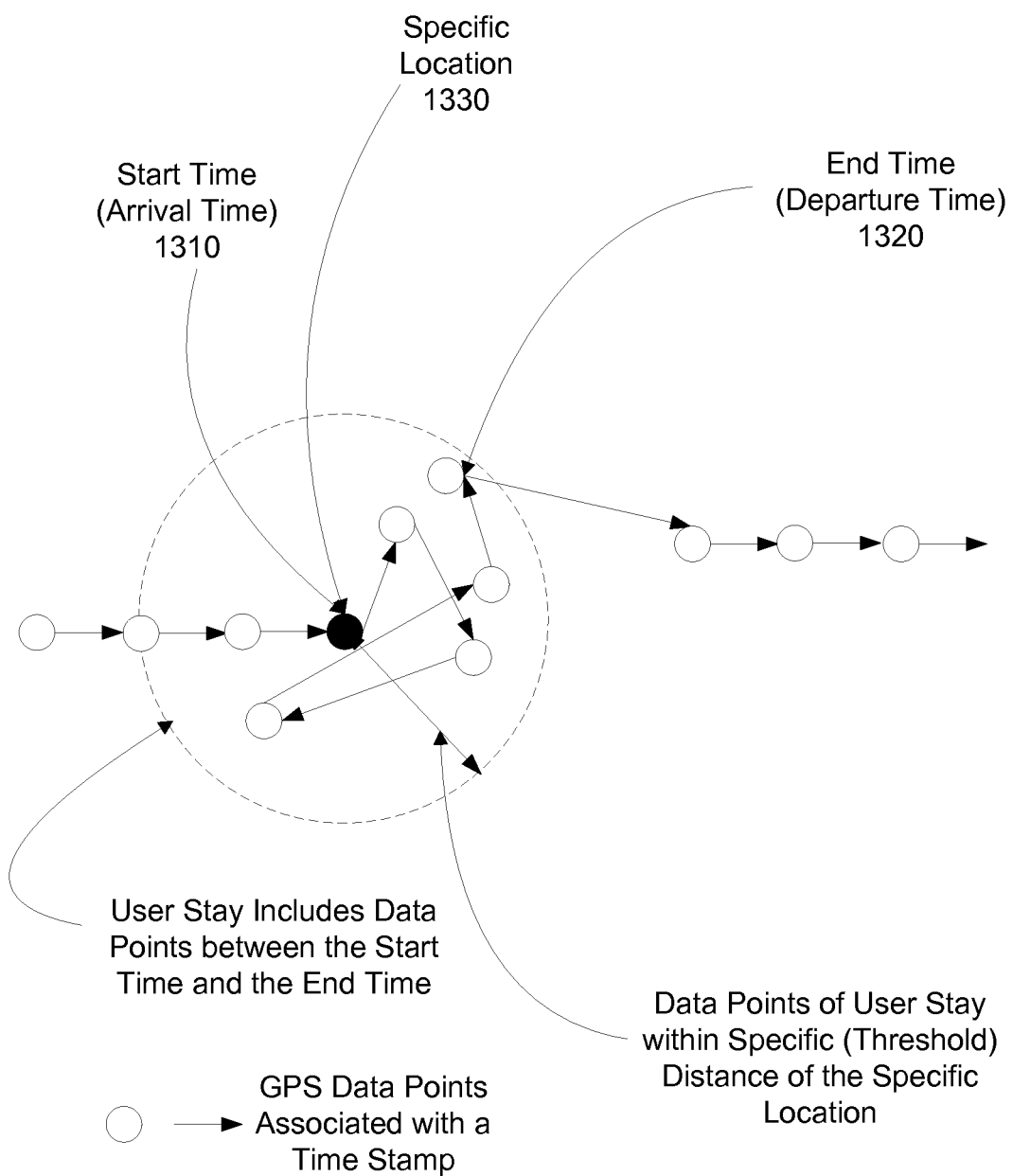
FIG. 13 shows a time sequence of location data points that are used to identify a user stay, according to another embodiment.

FIG. 13 shows a time sequence of location data points that are used to identify a user stay, according to another embodiment. For this embodiment, the specific location corresponds with the location data point that is determined to be the start time 1310 of the user stay. Again, for this embodiment, the user stay is determined based on the start time 1310, the end time 1320, and the specific location 1330 (which in FIG. 13 corresponds with the start time 1310).

Figure 14:
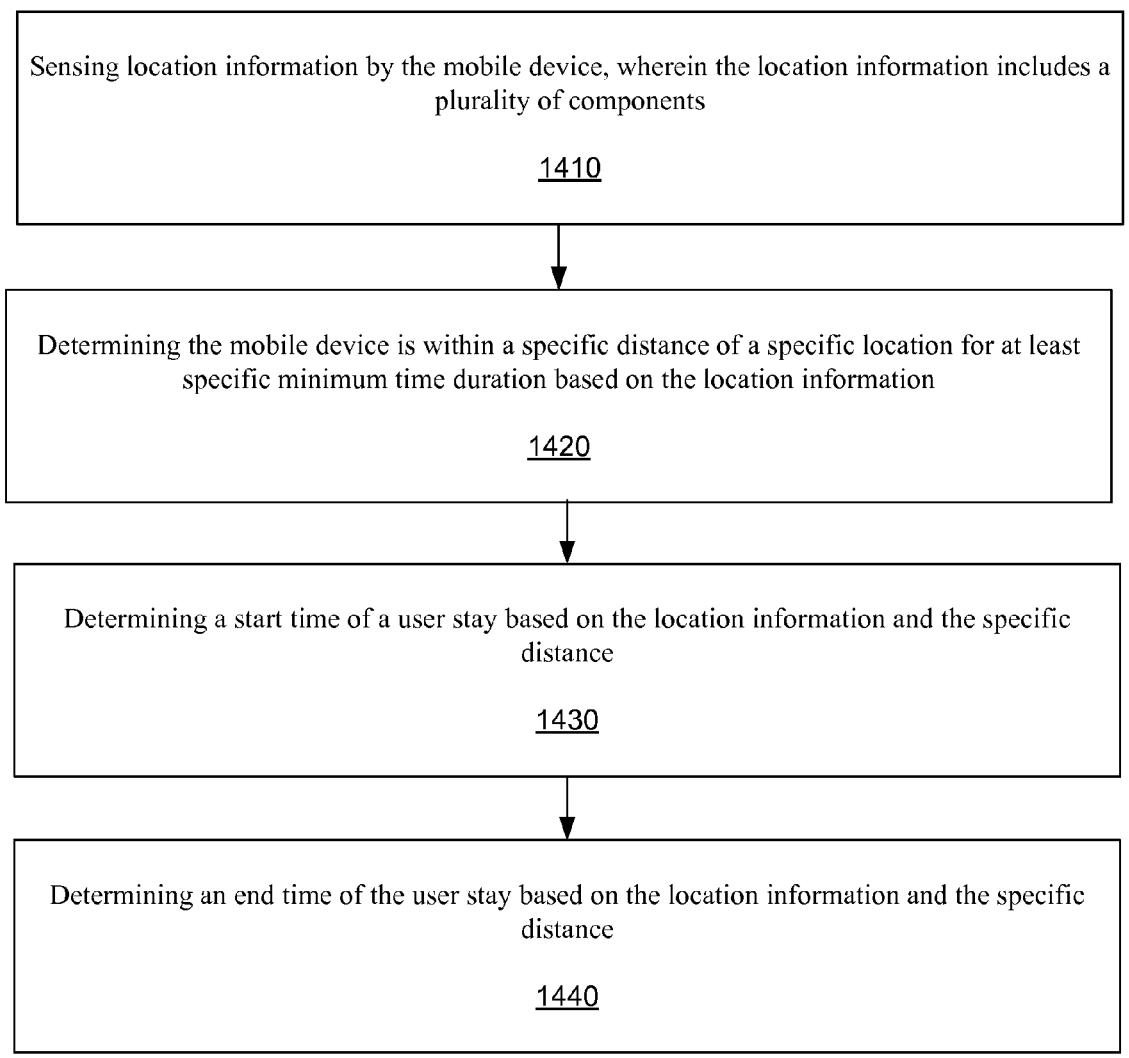
FIG. 14 is a flow chart that includes steps of an example of a method of automatically determining user stays of a user of a mobile device, according to an embodiment.

FIG. 14 is a flow chart that includes steps of an example of a method of automatically determining user stays of a user of a mobile device, according to an embodiment. A first step 1410 includes sensing location information by the mobile device, wherein the location information includes a plurality of components. A second step 1420 includes determining the mobile device is within a specific distance of a specific location for at least specific minimum time duration based on the location information. A third step 1430 includes determining a start time of a user stay based on the location information, the specific location the specific distance. A fourth step 1440 includes determining an end time of the user stay based on the location information, the specific location the specific distance.

For at least some embodiments, a user stay of a user of the mobile device is defined by the mobile device being within the specific distance (which for at least some embodiments, is determined by a threshold physical distance) of a location for at least the specific minimal duration (which can also be defined by a threshold period of time). As described, the location of the mobile device changes over time, and the specific location will change over time as the location changes. The location of the mobile device is tracked over time. A distance of the mobile device can be defined by the distance of each location point (such as, GPS data point) associated with the mobile device to a location, such as, the specific location. The minimal time duration can be defined by the amount of time the mobile device is within the specific distance (or threshold distance) from the specific location.

For at least some embodiments, the specific location adaptively changes over time as the mobile device moves. At least some embodiments include determining the specific location, including statistically calculating the specific location based on a plurality of locations of the mobile device over a period of time. For an embodiment, the period of time is determined based on the start time and the end time.

An embodiment includes associating a candidate Point of Interest (POI) with the specific location, and adaptively determining the specific distance based on the POI. An embodiment includes adaptively determining the specific minimum time duration based on the POI.

As stated, location data points are generated for the mobile device. Further, at least some embodiments include determining whether the data points are within the specific distance of the specific location. For an embodiment, the specific distance is determined as the average distance of all track points (data points) from a median user stay location. For an embodiment, the specific distance is determined as an average distance of all track points from centroid of the user stay. For an embodiment, the specific distance is determined as a maximum distance of all track points from median user stay location. For an embodiment, the specific distance is determined as the minimum distance of all track points from median user stay location. For an embodiment, the specific distance is determined as the maximum distance of all track points from centroid of the user stay. For an embodiment, the specific distance is determined as the minimum distance of all track points from centroid of the user stay. For an embodiment, the specific distance is determined as the median distance of all track points from centroid of the user stay. For an embodiment, the specific distance is determined as the median distance of all track points from median user stay location. For an embodiment, the specific distance is determined as the 95 percentile of distances of all track points from centroid of the user stay. For an embodiment, the specific distance is determined as the 95 percentile of distance of all track points from median user stay locations.

Location Information

For at least some embodiments, the location information includes at least a time stamp, latitude, longitude. For at least some embodiments, the location information includes at least one of speed, accuracy of location, location type (GPS or network), and motion states.

For at least some embodiments, the location information includes at least controller state information. That is, the controller of the mobile device, or other controllers, such as, a GPS controller may selectively enter low-power of sleep states upon detecting limited activity of the mobile device. Therefore, it can be deduced that the mobile device is experiencing limited motion or location change. Accordingly, for at least some embodiments, the location information includes at least GPS state information, which is defined, controlled and provided by a controller of the mobile device, and wherein the GPS state information includes a GPS off state, a GPS wake up state, and a GPS on state. For at least some embodiments, the GPS state includes additional states, such as, a GPS driving etc.

For at least some embodiments, the location information includes a stream of location points, and determining the start time of the user stay includes determining that a physical distance between N successive location points is less than a threshold. For at least some embodiments, the location information includes a stream of location points, and determining the start time of the user stay comprises determining that an average speed between N successive location points is less than a threshold.

Start Time

For at least some embodiments, the location information includes a stream of location points over a period of time, and determining the start time of the user stay includes random movement pattern. For at least some embodiments, the location information includes a stream of location points over a period of time, and determining the start time of the user stay includes determining that a bearing deviation of N successive location points is greater than a threshold. In an embodiment, the bearing at a track point is the angle between two segments, wherein a segment is defined as including consecutive location points. One segment is the from the last track point to North Pole. The other segment is from the last track point to the current track point. The standard deviation of this number during that predetermined time period is the bearing deviation. For at least some embodiments, the location information includes a stream of location points over a period of time, and determining the start time of the user stay includes determining that an absolute steering of N successive location points is less than a threshold. In an embodiment, the steering is the bearing at the current track point minus the bearing at previous track point. The average of the absolute values of this number during the time window is absolute steering. For at least some embodiments, the location information includes a stream of location points over a period of time, and determining the start time of the user stay includes determining that a leading trail of the location points satisfies a straightness criteria, including measuring by $r^2$ from a regression, and determining that $r^2$ is less than a threshold. For at least some embodiments, determining that the leading trail includes a complete, single, average or quartile linkage distance. In an embodiment, the linkage function calculates user stay quality metric. A user stay is hypothesized to exist during a leading period of time that is either determined by a fixed time period or including contiguous points all of which are within some distance of the current track point.

For at least some embodiments, the location information includes a stream of location points over a period of time, and determining the start time of the user stay comprises determining acceleration between successive location points, and identifying acceleration between the points less than a threshold. For at least some embodiments, the acceleration at the current track point is approximated by first calculating speed using the distance and time between each track point and the previous track point. The change in speed between the current track point and previous track point is the computed acceleration. For example, the computed accelerations in the past minute is averaged and used as the smoothed acceleration.

For at least some embodiments, determining the start time of the user stay includes determining that a GPS receiver of the mobile device is deactivated, thereby indicating motion of the mobile device less than a threshold. Being deactivated indicates a lack of motion and then it is likely a user stay begins.

Quality Metric

For at least some embodiments, the location information includes a stream of location points over a period of time, and further comprising using a hypothetical user stay to produce desired quality metrics. For an embodiment, the quality metric is based on an average distance of the stream of location points from a median location of the user stay. For an embodiment, the quality metric is based on an average distance of the stream of location points from the centroid location of the user stay. For an embodiment, the quality metric is based on a maximum distance of the stream of location points from a median location of the user stay. For an embodiment, the quality metric is based on a minimum distance of the stream of location points from a median location of the user stay. For an embodiment, the quality metric is based on a maximum distance of the stream of location points from the centroid location of the user stay. For an embodiment, the quality metric is based on a minimum distance of the stream of location points from the centroid location of the user stay. For an embodiment, the quality metric is based on a medium distance of the stream of location points from the centroid location of the user stay. For an embodiment, the quality metric is based on a medium distance of the stream of location points from a median location of the user stay. For an embodiment, the quality metric is based on a 95% of distance of the stream of location points from the centroid location of the user stay. For an embodiment, the quality metric is based on a 95% of distance of the stream of location points from a median location of the user stay. For at least some embodiment, the small the above metrics, the highly likely the user has entered a user stay.

Centroid

For at least some embodiments, statistically calculating the specific location comprises estimating a centroid of the user stay based on at least the start time, the end time of the user stay, and the sequence of data points between the start time and the end time. For at least some embodiments, the location information includes a stream of location points over a period of time, and determining the end time of the user stay comprises determining that a distance of a location point from the centroid of is greater than a threshold.

For at least some embodiments, the location information includes a stream of location points over a period of time, and determining the centroid of the user stay comprises filtering the stream of location points, and determining a coordinate-wise mean of the a plurality of the location points of the stream. For at least some embodiments, the location information includes a stream of location points over a period of time, and determining the centroid of the user stay comprises filtering the stream of location points, and determining a weighted average of the a plurality of the location points of the stream. For an embodiment, the weighted average is dependent upon an accuracy of the location points. For an embodiment, the weighted average is dependent upon a state of a GPS receiver of the mobile user. For an embodiment, the weighted average is dependent upon symmetrically decaying a weight as an exponential function of time from a specified location point. For an embodiment, the weighted average is dependent upon time elapsed since or to an absolute closest time within a user stay wherein there is a GPS data point. For an embodiment, the weighted average is dependent upon a linearity of location points immediately preceding or following a current location point. For an embodiment, the weighted average is dependent upon a time distance from a chronological center of a current user stay. For an embodiment, the weighted average is dependent upon a time from a current GPS location point to a next GPS location point.

For an embodiment, the location information includes a stream of location points over a period of time, and determining the weighted average of the plurality of the location points of the stream comprising a time-weighted centroid algorithm. For an embodiment, time weighted centroid is a process that computes the centroid of a user stay by giving different weight to each GPS point that belongs to the user stay.

End Time

For at least some embodiments, the location information includes a stream of location points over a period of time, and determining the end time of the user stay comprises determining that a speed of the mobile device as determined from successive location points is greater than a threshold. For at least some embodiments, the location information includes a stream of location points over a period of time, and determining the end time of the user stay comprises determining that a bearing of successive location points is less than a threshold. For at least some embodiments, the location information includes a stream of location points over a period of time, and determining the send time of the user stay comprises determining that a uniformity of steering of successive location points is less than a threshold.

For at least some embodiments, the location information includes a stream of location points over a period of time, and determining the end time of the user stay comprises determining that an accuracy of GPS readings of the successive location points is less than a threshold. For at least some embodiments, the location information includes a stream of location points over a period of time, and determining the end time of the user stay comprises determining that GPS readings of the successive location points has been absent for greater than a time threshold.

Start Time, End Time

For at least some embodiments, the location information includes a stream of location points over a period of time, and determining the start and end time of the user stay further comprises adjusting the determined start or end time based on estimated distance between a location of the start time and a location of the end time. For at least some embodiments, the location information includes a stream of location points over a period of time, and determining the start and end time of the user stay comprises a merge algorithm that merges two or more adjacent user stays if the two or more user stays are within a threshold of time, and the two or more user stays are within a threshold of distance of proximity of each other.

Merging

For at least some embodiments, a merge algorithm merges two or more adjacent user stays if they are close in time (within certain minutes of each other) and that they are within close proximity of each other (within certain distance threshold).

For at least some embodiments, the location information includes a stream of location points over a period of time, wherein the steam of location points are received by a back-end server in a batch, which are then processed.

Although specific embodiments have been described and illustrated, the embodiments are not to be limited to the specific forms or arrangements of parts so described and illustrated.

What is claimed:

1. A method of automatically detecting and sharing user stays of a mobile device of a user, comprising:
   persistently sensing, by at least one sensor of the mobile device, at least spatial information of the mobile device;
   determining a group of users for sending notifications and sharing the user stays;
   determining whether the mobile device is within a specific distance of a specific location for at least a specific minimum duration based on the at least spatial information;
   determining a user stay of a plurality of user stays based on the at least spatial information and the specific distance, comprising automatically determining and tracking the plurality of user stays of the user over time without the user proactively or reactively providing input associated with a location or a point of interest for at least one of the plurality of user stays, wherein the plurality of user stays include the specific location, and wherein the at least one user stay comprises a point of interest the user has visited, an arrival time, a departure time, and a length of time the user stays at the point of interest, wherein the at least one user stay is detected by clustering user location data continuously collected by the mobile device of the user, and matching the clustered user location data with the point of interest;
   determining if the user stay of the plurality of user stays is private or public to at least a portion of the group of users based on preferences of the user and the location information, wherein the user stay is shared with the at least a portion of the group the user when the user selects a public mode, and the user stay is not shared when the user selects a private mode; and
   sharing the user stay with the at least the portion of the group of users by sending notifications to the group of users if the user stay is determined to be public to the at least the portion of the group of users, wherein the sending of the notifications is triggered upon determination of the arrival time or the departure time of the user stay.

2. The method of claim 1, further comprising sharing other location information to the at least the portion of the group of users after determining the user has selected the public mode.

3. The method of claim 1, further comprising identifying a point of interest (POI) for the user stay based on the location information and user stay history of the user and user stay history of the group of users, wherein the user stay history of the user includes past user stays of the user, and wherein the user stay history of the group of users includes past user stays of the group of users.

4. The method of claim 1, wherein the group of users for sharing the user stay comprises pair-wise connections, where a pair of connected users share user stay information with each other.

5. The method of claim 1, wherein the group of users for sharing the user stay comprises a unidirectional following relationship, wherein the user shares user stays with users of the group of users who want to follow the user.

6. The method of claim 1, wherein the group of users for sharing the user stay comprises a membership, wherein users in the group share user stay information with all members of the group of users.

7. The method of claim 1, wherein determining if a user stay is private or public to the group members, further comprises the user specifying a list of points of interest (POIs), POI categories, geographical regions, and time of day and/or day of week that are private or public.

8. The method of claim 7, wherein the user specifies a list of users who do not receive notifications or see user stays of the user.

9. The method of claim 3, wherein sharing the user stay comprises sending a push notification, SMS (small messaging system), or emails to group members about the arrival and the departure of the user stay and other related information, wherein the arrival includes the arrival time of the user stay and the POI, and the departure includes the departure time of the user stay and the POI.

10. The method of claim 9, further comprising determining if the push notification should be sent comprising checking a specification by the user of the user stay and recipients of the push notification using a black list or a white list of POIs, POI categories, geographical regions, time of day and/or day of week.

11. The method of claim 1, wherein sharing the user stay comprises displaying the user stay on a timeline to members of the group of users in which the timeline consists of a series of arrivals and departures of user stays of a user stay history of the user and a user stay history of the group of users and ordered by timing of the arrivals and timing of the departures.

12. The method of claim 11, wherein the timeline includes an arrival portion that includes the arrival time, a point of interest (POI), and a user name of the user stay.

13. The method of claim 11, wherein the timeline includes departure portion that includes the time, a point of interest (POI), and a user name of the user stay.

14. The method of claim 1, wherein sharing the user stay comprises displaying a timeline of arrivals and departures of multiple members of the group of users, comprising merging events generated by the multiple members into a single event if user stays of the events are at a same POI during an overlapped period of time.

15. The method of claim 1, further comprising detecting an arrival or departure of a POI (point of interest) associated with the users stay, wherein the detecting triggers user specified actions including at least one of displaying a note, prompting a TODO list, playing a recorded voice message, sending an email, making a phone call, or triggering actions on third party services.

16. The method of claim 15, wherein the user specified actions are specified by the user of the user stay or a recipient of the user stay using a white list of POIs, POI categories, geographic regions, time of day or day of the week.

17. The method of claim 1, further comprising identifying a POI (point of interest) for the user stay comprises matching the POI with the user stay based on the location information, a database of nearby POIs, number of visits of POIs previous visited by the user or group members, or POIs corrected or added by members of the group of users.

18. The method of claim 17, further comprising members of the group of users correcting selected POIs of other members of the group of users.

19. The method of claim 1, further comprising sharing real-time location information comprising sharing a location of a mobile device of the user in transit between two user stays to group members.

20. The method of claim 19, wherein sharing real-time location comprises:
   initiating a sharing session, comprising;
      sending a sharing request from a recipient device using push notification to the mobile device in transit;
      maintaining a persistent network connection from a backend server to the mobile device in transit to wait for accepting a sharing request initiated from the recipient device.

21. The method of claim 20, wherein sharing real-time location comprises:
   proactively initiating the sharing session by the mobile device in transit and constantly publishing location information to the server while in transit.

22. The method of claim 1, wherein sharing the other location information comprises performing a user stay behavior analysis of the user and performing a social behavior analysis of members of the group of users.

23. The method of claim 22, wherein the user stay behavior analysis comprises automatically identifying unusual user stay behavior of the user and the group of users, wherein the identified unusual user stay behavior includes the user visiting a never-visited place or staying at a place for a longer time than previously tracked.

24. The method of claim 22, wherein the social behavior analysis comprises automatically identifying time of day, day of week, and duration that members of the group of users spend time together at the same place.

25. The method of claim 22, wherein the user stay behavior analysis comprises automatically identifying home and work places for the user based on user stay history of the user.

26. The method of claim 22, wherein the user stay behavior analysis comprises automatically identifying top places visited by the user and top places for a category visited by the user.

27. The method of claim 1, wherein determining the group of users comprises automatically discovering nearby users and recommending the nearby users to establish connections to establish the group of users, wherein nearby is defined by a selected distance.

28. A system for tracking and sharing user stays of a mobile device, comprising:
   a backend server electronically coupled to the mobile device;
   at least one sensor of the mobile device operative to persistently sense spatial information of the mobile device;
   the mobile device operative to collect the spatial information; wherein
   a processor of the backend server is operative to:
   automatically determine and track a plurality of user stays of the user over time without the user proactively or reactively providing input associated with a location or a point of interest for at least one of the plurality of user stays, wherein the plurality of user stays include at least one location, wherein the at least one location is determined at least in part by the sensed spatial information, and wherein the at least one user stay comprises a point of interest the user has visited, an arrival time, a departure time, and a length of time the user stays at the point of interest, wherein the at least one user stay is detected by clustering user location data continuously collected by the mobile device of the user, and matching the clustered user location data with a nearby point of interest;
   determine a group of users for sending notifications and sharing the user stays;
   determine if a user stay is private or public to at least a portion of the group of users based on preferences of the user and the location information, wherein the user stay is shared with the at least a portion of the group the user when the user selects a public mode, and the user stay is not shared when the user selects a private mode; and
   share the user stay with the at least the portion of the group of users by sending notifications to the group of users if the user stay is determined to be public to the at least the portion of the group of users, wherein the sending of the notifications is triggered upon determination of the arrival time or the departure time of the user stay.

29. A system, comprising:
   a mobile device, wherein the mobile device comprises:
   at least one sensor operative to persistently sense at least spatial information of the mobile device;
   a transceiver operative to establish a communication link with a network server; and
   a controller;
   the system further comprising the network server, the system configured to:
   determine a group of users for sending notifications and sharing the user stays;
   determine whether the mobile device is within a specific distance of a specific location for at least specific minimum duration based on the at least spatial information;
   determine a user stay of a plurality of user stays based on the location information and the specific distance, comprising automatically determining and tracking the plurality of user stays of the user over time without the user proactively or reactively providing input associated with a location or a point of interest for at least one of the plurality of user stays, wherein the plurality of user stays include the specific location, and wherein the at least one user stay comprises a point of interest the user has visited, an arrival time, a departure time, and a length of time the user stays at the point of interest, wherein the at least one user stay is detected by clustering user location data continuously collected by the mobile device of the user, and matching the clustered user location data with the point of interest;
   determine if the user stay of the plurality of user stays is private or public to at least a portion of the group of users based on preferences of the user and the location information, wherein the user stay is shared with the at least a portion of the group the user when the user selects a public mode, and the user stay is not shared when the user selects a private mode; and share the user stay with the at least the portion of the group of users by sending notifications to the group of users if the user stay is determined to be public to the at least the portion of the group of users, wherein the sending of the notifications is triggered upon determination of the arrival time or the departure time of the user stay.

* * * * *